United States Patent [19]

Honguh et al.

[11] Patent Number: 5,474,826
[45] Date of Patent: Dec. 12, 1995

[54] OPTICAL RECORDING MEDIUM AND OPTICAL RECORDING/REPRODUCING APPARATUS

[75] Inventors: Yoshinori Honguh; Toyoki Taguchi, both of Yokohama; Hiroshi Hasegawa, Kawasaki; Tadashi Kobayashi, Chiba; Naoki Morishita; Naomasa Nakamura, both of Yokohama, all of Japan

[73] Assignee: Kabushiki Kaisha Toshiba, Kawasaki, Japan

[21] Appl. No.: 419,943

[22] Filed: Apr. 11, 1995

Related U.S. Application Data

[63] Continuation of Ser. No. 40,291, Mar. 30, 1993, Pat. No. 5,431,975.

[30] Foreign Application Priority Data

| | | | |
|---|---|---|---|
| Mar. 30, 1992 | [JP] | Japan | 4-072032 |
| Apr. 15, 1992 | [JP] | Japan | 4-095613 |
| Oct. 1, 1992 | [JP] | Japan | 4-262628 |

[51] Int. Cl.⁶ .................................................. B32B 3/00
[52] U.S. Cl. ...................... 428/64.6; 428/913; 428/65.1; 369/100; 369/121; 430/270; 430/945
[58] Field of Search ..................... 428/64, 65, 913; 430/270, 945; 369/100, 121, 283

[56] References Cited

U.S. PATENT DOCUMENTS

| | | | |
|---|---|---|---|
| 5,130,971 | 7/1992 | Ohno | 369/116 |
| 5,233,599 | 8/1993 | Ohno | 369/288 |
| 5,255,260 | 10/1993 | Yamada | 369/199 |
| 5,289,453 | 2/1994 | Ohno | 369/100 |
| 5,348,783 | 9/1994 | Ohno | 428/64 |
| 5,396,480 | 3/1995 | Morishita | 369/116 |

*Primary Examiner*—Patrick J. Ryan
*Assistant Examiner*—Elizabeth Evans
*Attorney, Agent, or Firm*—Oblon, Spivak, McClelland, Maier, & Neustadt

[57] ABSTRACT

An optical recording medium comprises a transparent substrate, an inner protection layer, a recording material layer, an outer protection layer, and a reflection layer, which are laminated in this order. In an in-groove recording mode, the ratio of the thickness of the recording material layer to the thickness of the outer protection layer is in a range between 0.52 and 0.95. In an on-land recording mode, the ratio of the thickness of the recording material layer to the thickness of the outer protection layer is in a range between 0.32 and 0.6.

19 Claims, 20 Drawing Sheets

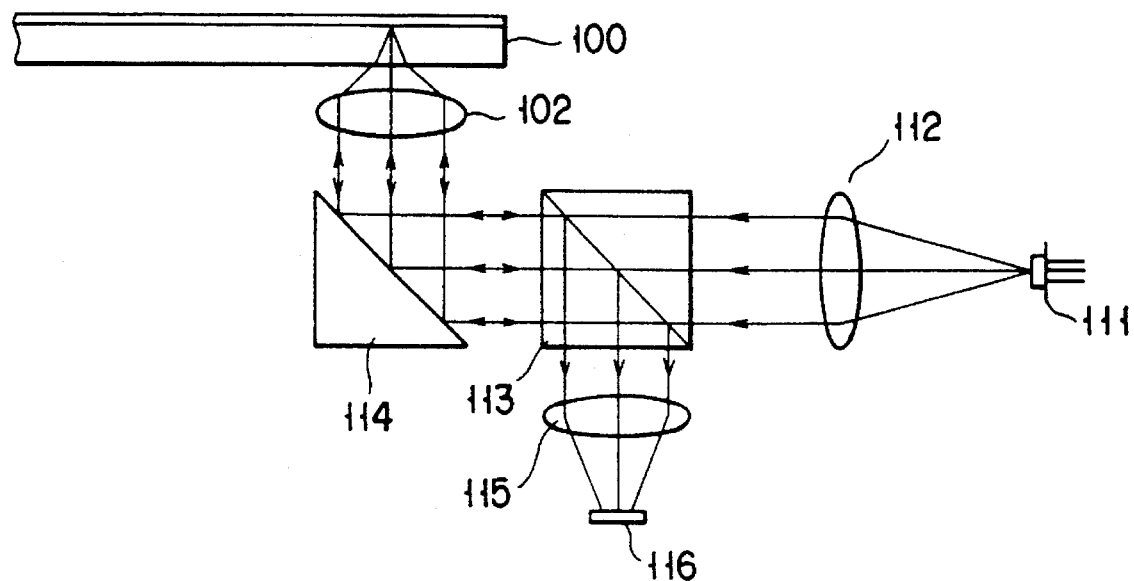
F I G. 1
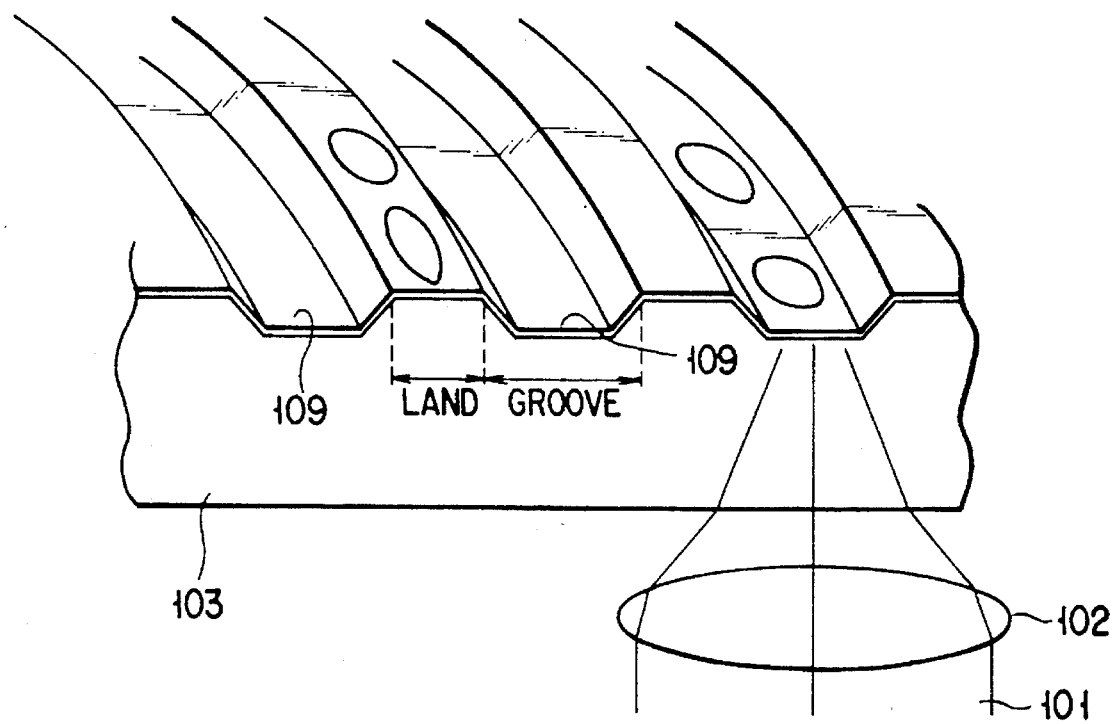
F I G. 2

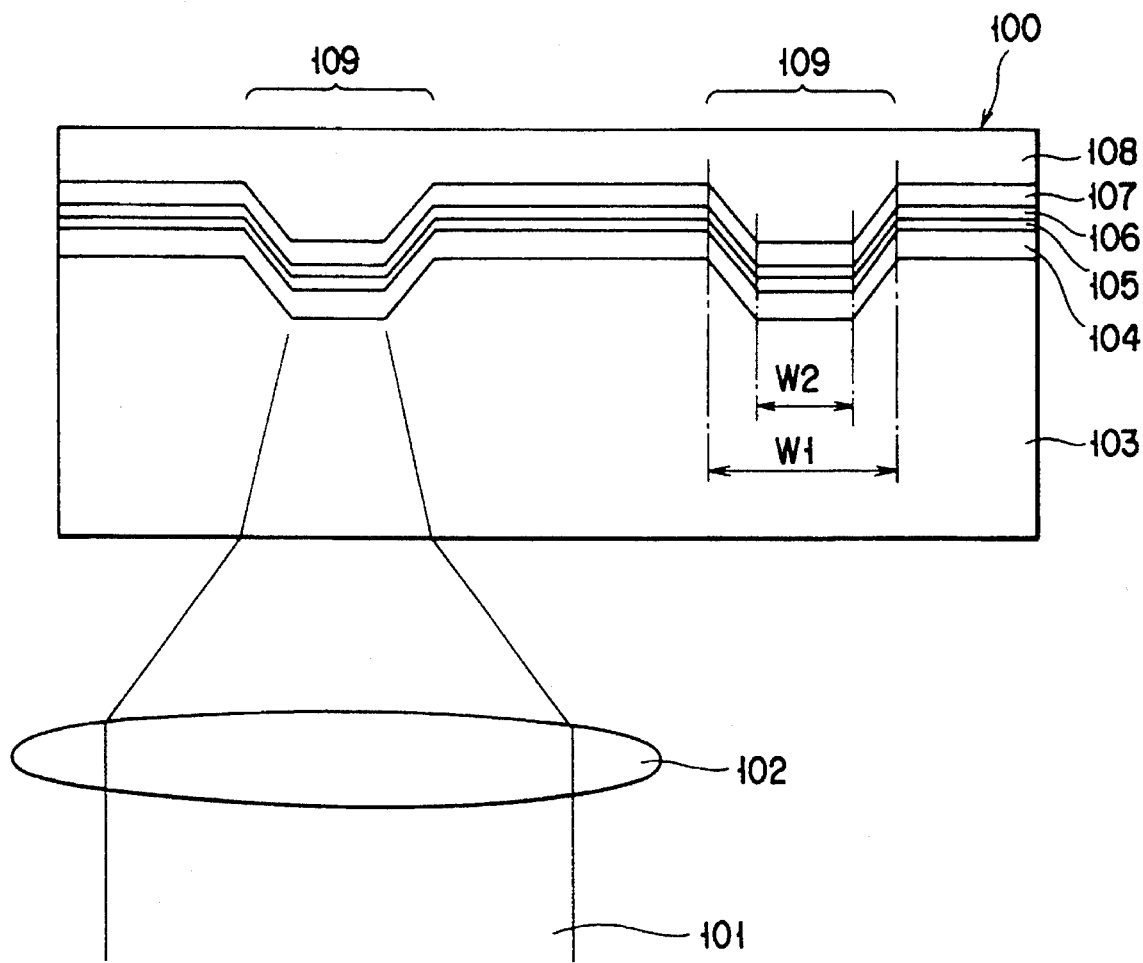
F I G. 3

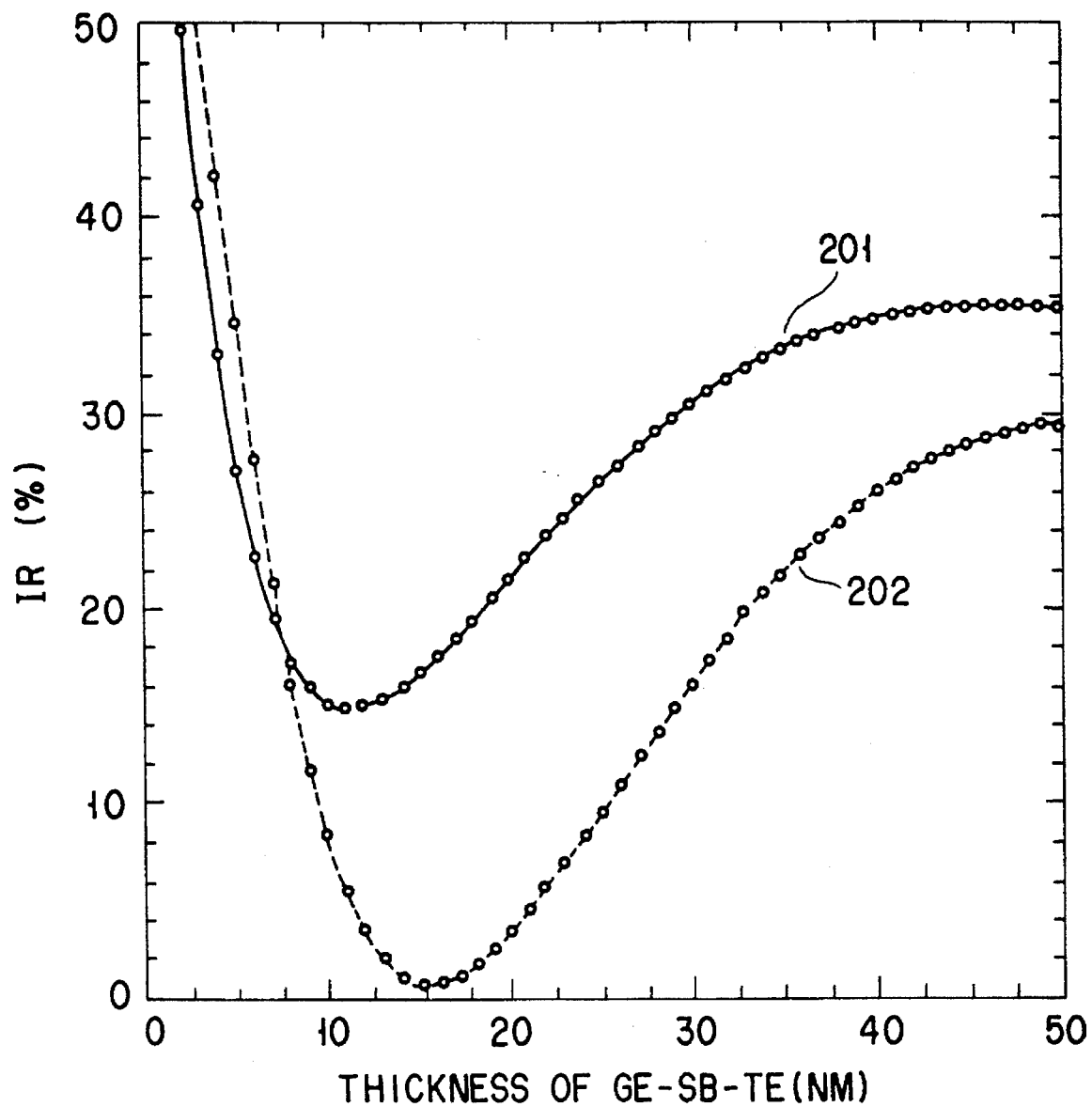
F I G. 4

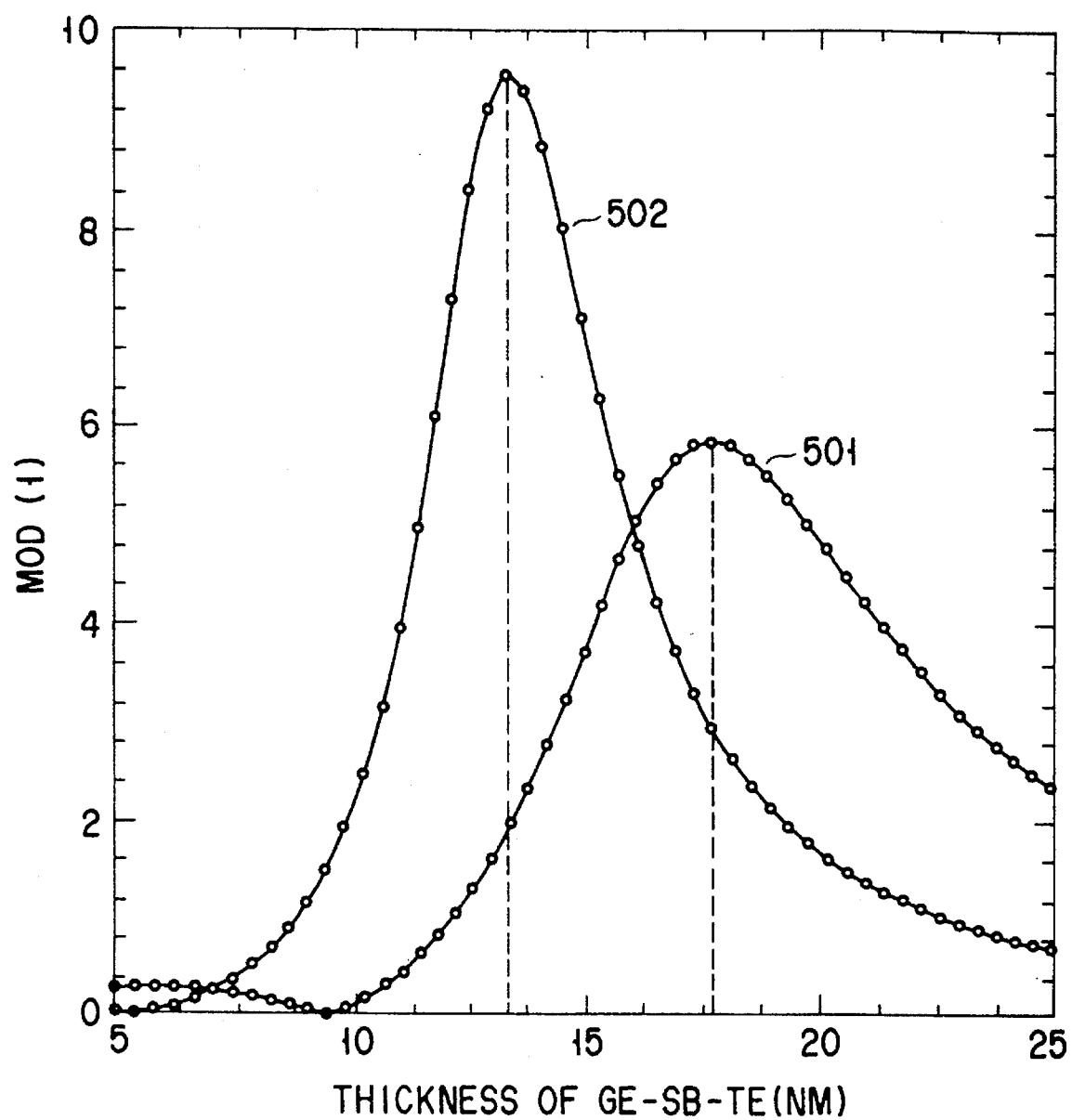
F I G. 7

| d2/d3 | MODULATION LEVEL |
|---|---|
| 0.4 | 0.46 |
| 0.5 | 1.91 |
| 0.52 | 2.29 |
| 0.6 | 3.73 |
| 0.7 | 3.99 |
| 0.8 | 3.16 |
| 0.9 | 2.34 |
| 0.95 | 2.03 |
| 1.0 | 1.77 |
| 1.2 | 1.10 |
| 1.4 | 0.76 |

FIG. 12

| d2/d1 | MODULATION LEVEL |
|---|---|
| 0.04 | 0.54 |
| 0.05 | 1.53 |
| 0.053 | 2.10 |
| 0.06 | 3.34 |
| 0.07 | 4.09 |
| 0.08 | 3.44 |
| 0.09 | 2.64 |
| 0.098 | 2.09 |
| 0.10 | 1.97 |
| 0.12 | 1.20 |
| 0.14 | 0.83 |

FIG. 13

| d2/d3 | MODULATION LEVEL |
|---|---|
| 0.28 | 1.17 |
| 0.3 | 1.67 |
| 0.32 | 2.17 |
| 0.4 | 5.76 |
| 0.44 | 6.42 |
| 0.5 | 4.62 |
| 0.6 | 2.02 |
| 0.62 | 1.77 |
| 0.64 | 1.52 |
| 0.7 | 1.04 |
| 0.8 | 0.60 |

FIG. 14

| d2/d1 | MODULATION LEVEL |
|---|---|
| 0.03 | 1.42 |
| 0.033 | 2.17 |
| 0.038 | 3.82 |
| 0.04 | 4.80 |
| 0.05 | 5.35 |
| 0.06 | 2.48 |
| 0.063 | 2.02 |
| 0.067 | 1.52 |
| 0.07 | 1.28 |
| 0.08 | 0.70 |
| 0.09 | 0.45 |

FIG. 15

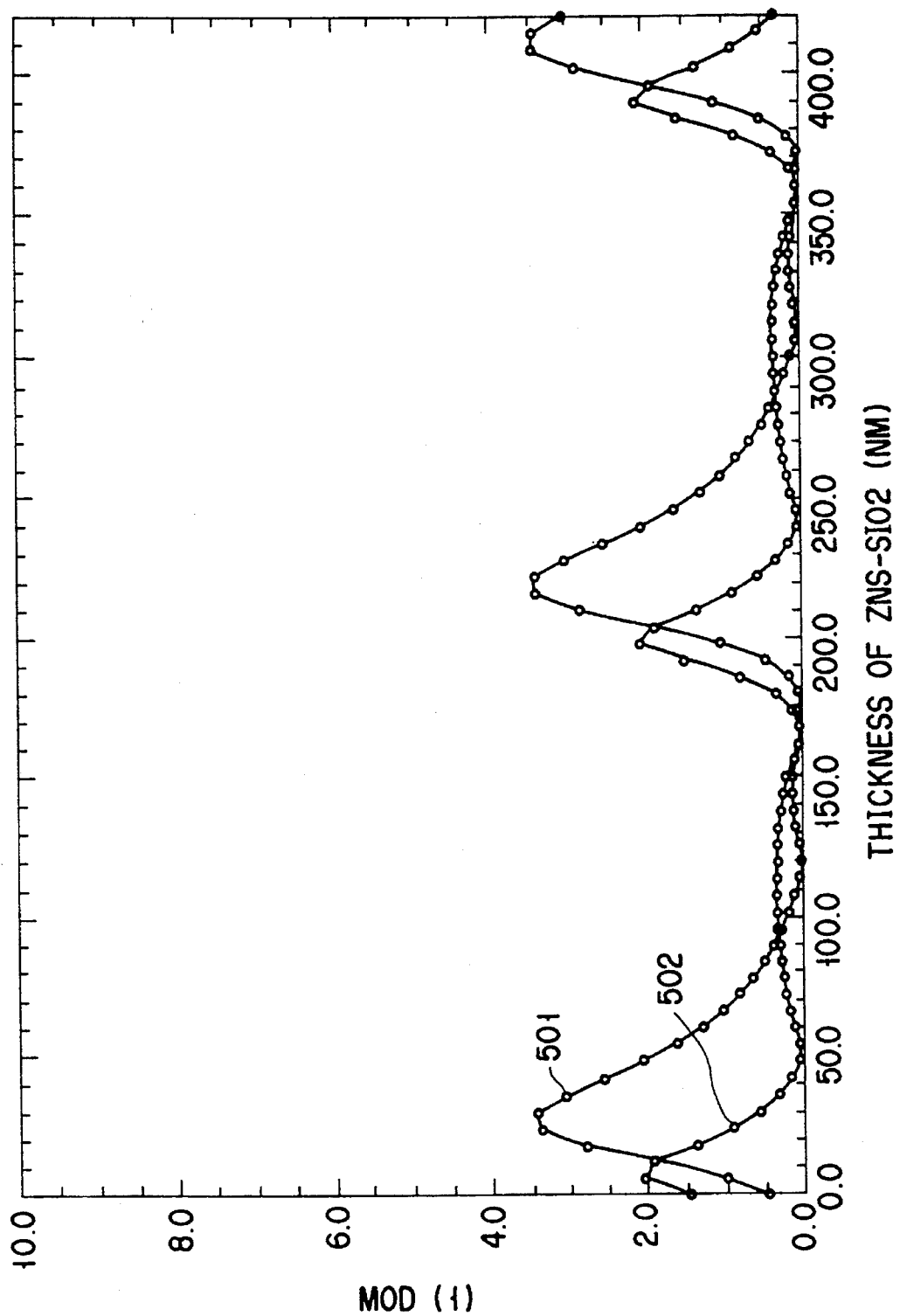
F I G. 17

1

OPTICAL RECORDING MEDIUM AND OPTICAL RECORDING/REPRODUCING APPARATUS

This is a Continuation of application Ser. No. 08/040,291 filed on Mar. 30, 1993, now U.S. Pat. No. 5,431,975 issued Jul. 11, 1995.

BACKGROUND OF THE INVENTION

1. Field of the Invention

In an optical disk apparatus, information is recorded along a spiral track or concentric tracks on a recording medium, and information signals are optically reproduced by irradiating a light beam such as a laser beam. A document file system has been put into market as an early model which enabled the user to record information signals on an optical disk by a laser beam. In recent years, an optical disk apparatus serving as a peripheral recording apparatus of computers which require higher reliability has also been put to practical use. In addition, an optical disk apparatus capable of erasing and rewriting recorded information signals has been put to practical use. The technique of this type of optical disk apparatus has been applied to an optical card memory apparatus or optical tape memory apparatus which uses a card-shaped recording medium or tape-shaped recording medium.

2. Description of the Related Art

In optical recording mediums used in these optical information recording/reproducing apparatuses, a record mark with a size of about 1 micron is formed on recording tracks with a track pitch of about 1.6 microns by means of a laser beam having a beam spot diameter of about 1.2 microns. Various methods of forming the record mark have been practically used. For example, optical properties of a recording film are varied by local destruction, deformation or phase-variation. Techniques of precisely tracing record tracks by means of a laser beam include a method wherein a track guide groove is provided in advance on an optical disk and a tracking error signal is detected from a diffraction beam from the track guide groove, and a method wherein signals from marks, which are formed on both sides of a track and are slightly displaced from each other, are sampled and compared, and a tracking error signal is detected.

it is desired that these optical disk apparatuses, like other recording apparatuses, have a wider range of applications, a larger capacity and a smaller size. To meet this demand, the recording density has been increased more and more. Further, in order to realize information rewrite and overwrite, various recording materials and various film structures of recording mediums have been developed.

According to prior art, e.g. "OVERWRITE CHARACTERISTICS ANALYSIS OF PHASE-TRANSITION OPTICAL RECORDING MEDIUM", Nakamura et al., Autumn, 1990, the Digest of the 51st Applied Physics Society Symposium "Crystallizing Mechanism and Erase Ratio of Phase-variation Type Optical Disc" (The Japan Society of Applied Physics, Oct. 30, 1990), pp. 42–48, there is disclosed a recording medium wherein the thickness of a second layer and the thickness of a fourth layer in a flat multilayered structure are varied to theoretically calculate the reflectance, and the thicknesses of the layers are determined so as to obtain a desired reflectance. According to this method, the thickness of a recording material layer is set at 20 nm and the thickness of the protection layer is set at 100 nm.

According to other prior art, "CHARACTERISTICS OF REWRITE TYPE PHASE-VARIATION OPTICAL DISC", Obayashi et al., winder, 1991, the Papers of the Second Symposium of Phase-variation Recording Research "Fundamentals and Application of Phase-variation Type Optical Disc" (the Committee of Phase-variation Recording of the Japan Society of Applied Physics, Jan. 31, 1991), pp. 20–29, there is disclosed a recording medium wherein the thickness of a recording layer and the thickness of a protection layer in a flat multilayered structure model are varied to theoretically calculate the reflectance, and the thickness of the recording layer is determined so as to obtain a desired reflectance. According to this method, the thickness of the recording layer is set at 20 nm to 45 nm.

Calculation relating to a flat multilayered structure model is relatively easy, and it is convenient and effective for general estimation. In the prior art, a medium structure is designed from such estimation, and thereafter this structure is applied to a substrate with a tracking guide groove.

Even if a medium is formed on the basis of a structure determined by a conventional method, a desired reproduction signal modulation level cannot always be obtained. The reason for this is that an interference occurs between a phase variation of reflected light due to the tracking guide groove and a phase variation of reflected light from the recording mark region, thereby to deteriorate signals. Thus, a desired S/N cannot be obtained, and improvement in recording density and reliability is prevented.

Furthermore, when a recorded signal is reproduced from a recording medium by a conventional optical recording/reproducing apparatus, noise due to a variation in wall shape of the guide groove formed in the recording medium, i.e. so-called groove noise, is mixed in the reproduced signal, and a desired S/N of the reproduced signal cannot be obtained, and improvement in recording density or reliability of the optical recording/reproducing apparatus is prevented.

SUMMARY OF THE INVENTION

An object of the present invention is to provide an optical recording medium having a medium structure which can be designed relatively easily and an effectively high reproduced signal modulation level.

According to the invention, there is provided an optical recording/reproducing apparatus comprising a transparent substrate, an inner protection layer formed on the transparent substrate, a recording material layer formed on the inner protection layer, an outer protection layer formed on the recording material layer, and a reflection layer formed on the outer protection layer, wherein the ratio of the thickness of the recording material layer to the thickness of the outer protection layer in an in-groove recording mode is in a range between 0.52 and 0.95.

According to the present invention, there is provided an optical recording medium comprising a transparent substrate, an inner protection layer formed on the transparent substrate, a recording material layer formed on the inner protection layer, an outer protection layer formed on the recording material layer, and a reflection layer formed on the outer protection layer, wherein the ratio of the thickness of the recording material layer to the thickness of the outer protection layer in an on-land recording mode is in a range between 0.32 and 0.6.

According to the invention, there is provided an optical recording/reproducing apparatus employing an in-groove recording system wherein a light beam is radiated via an objective lens on a recording medium, which stores information by forming a record mark within a guide groove, thereby recording/reproducing information, the guide groove being formed on the recording medium such that the ratio of the average value of widths of upper to lower portions of the guide groove to a value ($\lambda$/NA) obtained by dividing the wavelength ($\lambda$) of the light beam by the numerical aperture (NA) of the objective lens is set in a range of 0.25 to 0.4.

According to the invention, there is provided an optical recording/reproducing apparatus employing an inter-groove (on-land) recording system wherein a light beam is radiated via an objective lens on a recording medium, which stores information by forming a record mark between guide grooves, i.e. on a land, thereby recording/reproducing information, the guide groove being formed on the recording medium such that the ratio of a value obtained by subtracting the average value of widths of upper to lower portions of the guide groove from a track pitch to a value ($\lambda$/NA) obtained by dividing the wavelength ($\lambda$) of the light beam by the numerical aperture (NA) of the objective lens is set in a range of 0.25 to 0.4.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows an optical system of an optical recording/reproducing apparatus;

FIG. 2 is a partially cut-out perspective view of an optical recording medium according to a first embodiment of the present invention, which is used in the apparatus of FIG. 1;

FIG. 3 shows a cross-sectional structure of the optical recording medium shown in FIG. 2;

FIG. 4 is a graph showing calculation results of a reproduced signal level in the case where no groove is formed in the recording medium;

FIG. 7 is a graph showing the dependency of a signal modulation level upon film thickness;

FIG. 12 shows conditions for setting the thickness of a recording material layer and the thickness of an outer protection layer in in-groove recording;

FIG. 13 shows conditions for setting the thickness of a recording material layer and the thickness of an inner protection layer in in-groove recording;

FIG. 14 shows conditions for setting the thickness of a recording material layer and the thickness of an outer protection layer in on-land recording;

FIG. 15 shows conditions for setting the thickness of a recording material layer and the thickness of an inner protection layer in on-land recording;

FIG. 17 is a graph in which the signal modulation level in the recording medium according to the third embodiment of the invention is plotted;

DETAILED DESCRIPTION OF THE PREFERRED EMBODIMENTS

Figure 5:
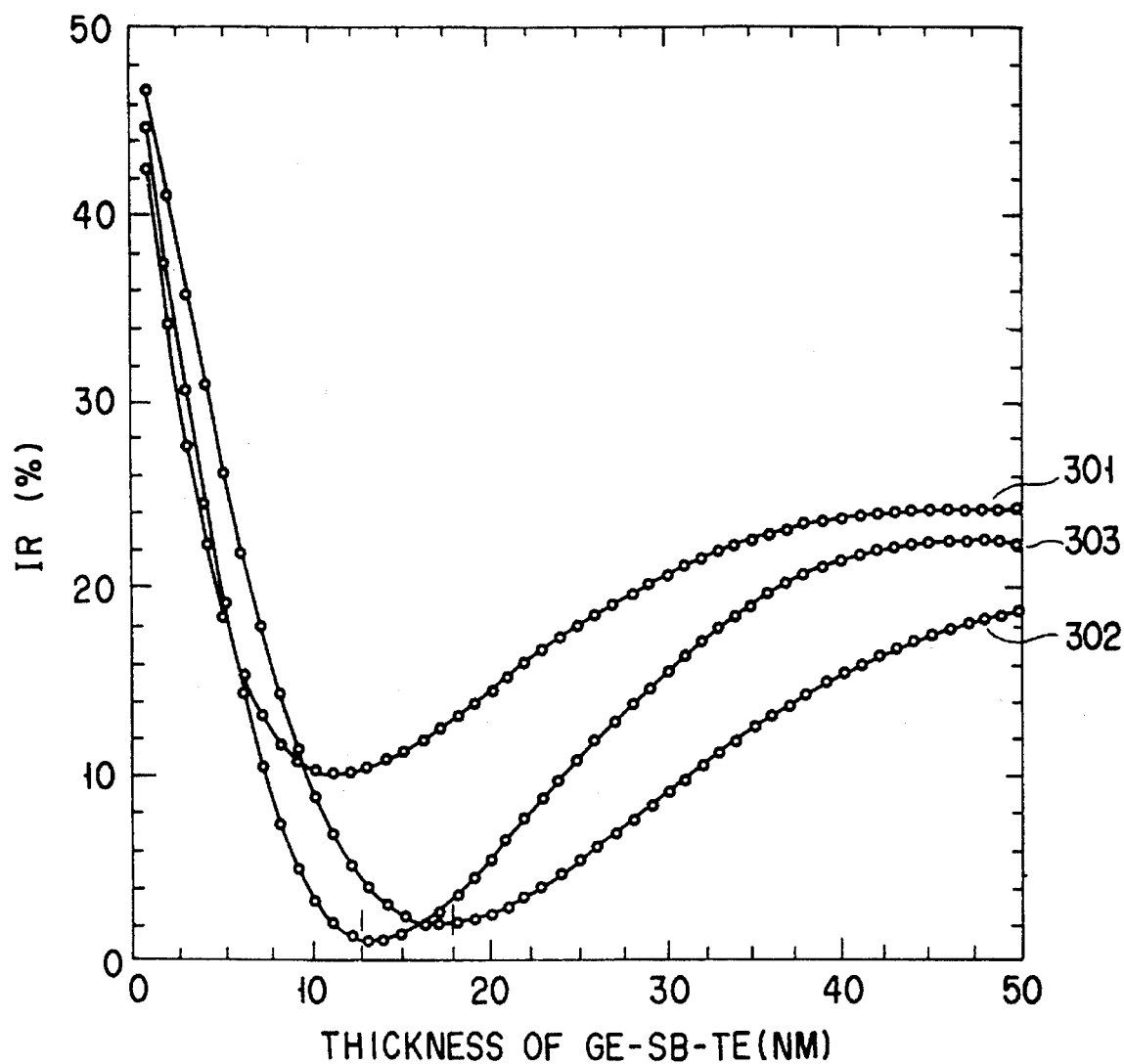
FIG. 5 is a graph showing calculation results of a reproduced signal level in the case where grooves are formed in the recording medium.

FIG. 1 shows an optical system of an optical recording/reproducing apparatus. An optical head 110 is situated below an optical recording medium or optical disk 100 such that the head 110 faces the disk 100. The optical head 110 comprises a converging lens 102 facing the optical disk 100; a laser element 111 for emitting a laser beam; a collimator lens 112 for collimating the laser beam emitted from the laser element 111; a beam splitter 113 for receiving a parallel laser beam from the collimator lens 112; a reflection mirror 114 having a reflection surface for reflecting the laser beam from the beam splitter 113 towards the converging lens 102 and for reflecting the beam, which has been reflected by the optical disk 100 and has traveled through the converging lens 102, towards the beam splitter 113; a converging lens 115 for converging the reflection beam which has been deflected by the beam splitter 113; and a light detector 116 for converting the reflection beam converged by the lens 115 to an electric signal.

The optical disk 100 is constructed as shown in FIGS. 2 and 3. Specifically, a plurality of tracking guide grooves 109 are formed in a transparent substrate 103 on which a laser beam emanating from the converging lens 102 is made incident. An inner protection layer 104, a recording material layer 105, an outer protection layer 106, a metallic reflection layer 107, and a disk protection layer 108 are laminated, in this order, on the guide groove side of the transparent substrate 103. Polycarbonate resin is used as material of the transparent substrate 103, and $ZnSiO_2$ is used as material of the inner protection layer 104 and outer protection layer 106. A GeSbTe-based phase-variation recording material is used for the recording material layer 105, Al (aluminum) is used for the reflection layer 107, and an ultraviolet-curing resin is used for the disk protection layer 108. There are limitations to the thickness of these layers in order to obtain appropriate recording characteristics of the recording medium. One condition for obtaining such characteristics is that the respective layers are formed such that an adequately high temperature rise for effecting recording in a narrow recording region can be achieved by radiating light on the recording medium in the recording mode. According to this embodiment, the thickness of the inner protection layer 104 is set at 100 nm, and that of the outer protection layer 106 is set at 20 nm. The thickness of the reflection layer 107 is set at 100 nm. Since the extinction coefficient of Al, of which the reflection layer 107 is formed, is relatively high, the thickness of the reflection layer 107 is not strictly limited. Even if the thickness of the reflection layer 107 exceeds 100 nm, the optical characteristics of the layer 107 do not greatly vary.

The variation in a reproduced signal due to the variation in thickness of the recording material layer is calculated in order to obtain a recording medium with recording characteristics in a practical range and high reproduction characteristics. This calculation is based on a method in which light propagation is analyzed in consideration of interference effect of a multilayered thin film. FIG. 4 shows the calculation results of a reproduced signal level according to this method, in the case where no groove is formed in the recording medium. In FIG. 4, the reflectance of the recording medium having the above-mentioned layers on the flat substrate is calculated with the thickness of the recording material layer being varied. This calculation is performed by use of the formulas described in M. Mansuripur, et al. "Lase-induced local heating of multilayers" Applied Optics vol. 21, No. 6, 15 Mar. 1982, H. H. Hoplins "Diffraction Theory of Laser Read-Out Systems for Optical video Disks," Janual of Optical Society of America 69, 4 (1979) or Y. Honguh, "Diffraction Analysis in Optical Disk," Optics, Vol. 20, No. 4, pp. 210–215 (1991).

A curve 201 indicates the case where the recording material layer is in the crystalline state, and a curve 202 indicates the case where it is in the amorphous state. The horizontal axis indicates the thickness of the recording material layer, and the vertical axis indicates the reflectance of the recording medium. The curve 201 represents the reflectance in the crystalline state, and the curve 202 represents the reflectance in the amorphous state. The crystalline state is the prerecording state of the recording medium, and the amorphous state is the post-recording state of the recording medium. If the thickness of the recording material layer is set at a value at which the difference between the levels of the two curves is large, a desirable reproduced signal with a high amplitude can be obtained. In the case where a high modulation level of a reproduced signal is desired, it suffices to set the thickness of the recording material layer at a value at which the post-recording reproduced signal level (reflectance) is low. However, in these calculation results, the mark size or tracking guide grooves are not taken into account.

Thus, the calculation results do not represent the actual optimal values.

FIG. 5 is a graph showing calculation results of a reproduced signal level in the case where grooves are formed in the recording medium. Specifically, FIG. 5 shows the calculation results of a reproduced signal level obtained before and after forming a mark in a medium with a groove having a track pitch of 1.2 microns and a groove width of 0.6 micron. In FIG. 5, a curve 301 indicates a pre-recording reflectance which is equal between an in-groove region and an inter-groove region. The reason for this is that the groove has a rectangular cross section with a groove width which is half the track pitch. A curve 302 indicates the calculation results regarding a post-recording reproduced signal level in the case of the in-groove recording mode in which a mark is formed in the groove by radiating a recording beam. A curve 303 indicates the calculation results in the case of the on-land recording mode in which a mark is formed in an inter-groove region by radiating a recording beam on a region between adjacent grooves. That is, FIG. 5 shows the calculation results relating to the two recording modes. In this analysis, the interference effect of the multilayered thin film, the phase shift due to the groove, and the diffraction effect relating to the converging optical system are taken into account. As can be understood from comparison between FIG. 5 and FIG. 4, the optical layered structure is different from the structure estimated from FIG. 4 because of the influence of the phase shift due to the presence of the groove. In addition, the optimal layered structure differs slightly between the two recording modes.

The behavior of the signal amplitude will now be explained in greater detail, in order to well understand the above relationship.

Figure 6:
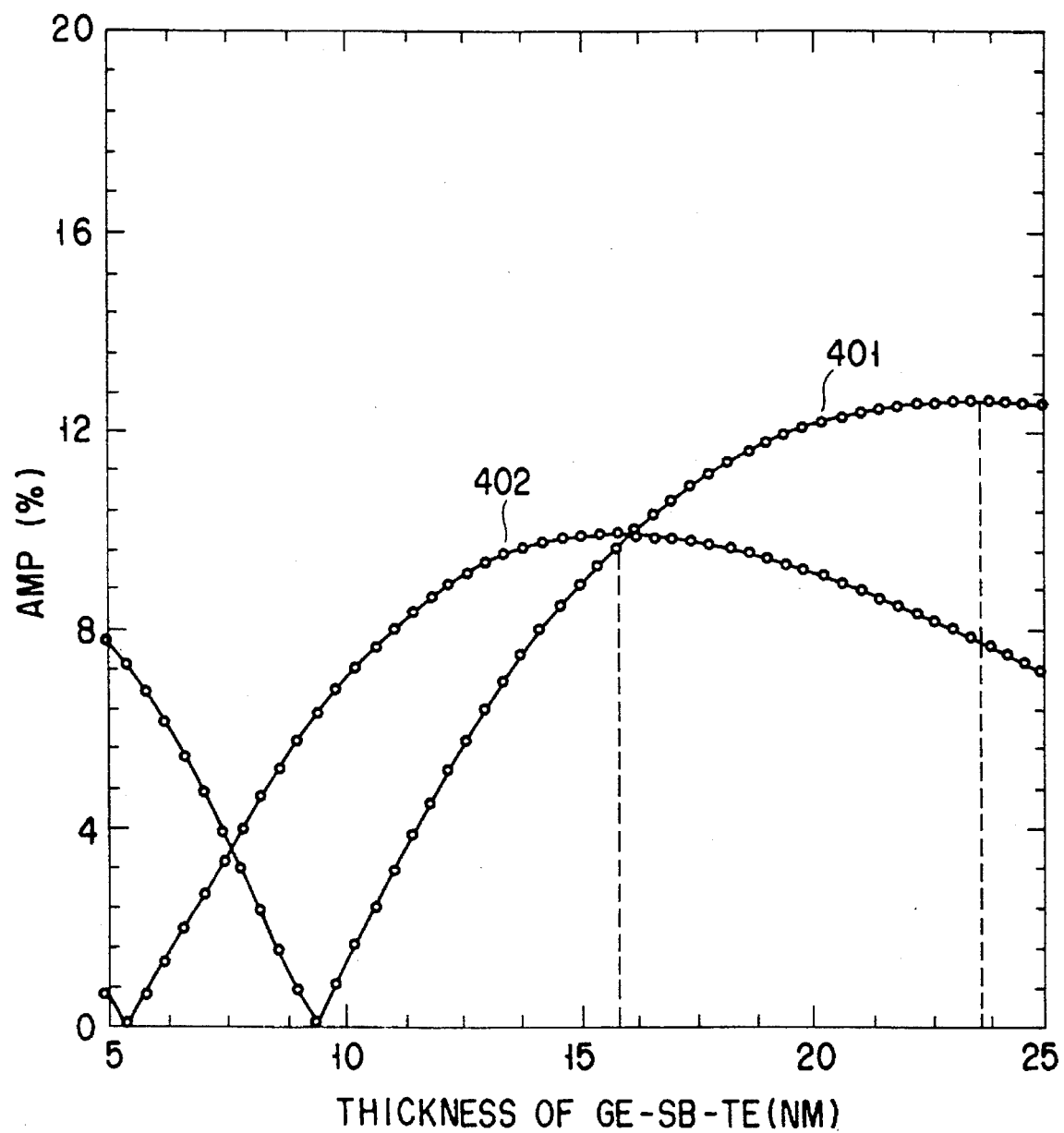
FIG. 6 is a graph showing the dependency of a signal amplitude upon film thickness.

FIG. 6 is a graph showing the dependency of a signal amplitude upon film thickness. A curve 401 indicates the calculation results relating to the in-groove recording, and a curve 402 indicates the calculation results relating to the on-land recording. According to FIG. 5, the amplitude peak in the in-groove recording mode is in the vicinity of 23.5 nm, and the amplitude peak in the on-land recording mode is in the vicinity of 16 nm. As can be seen from FIG. 5, if the film thickness is set at 80% to 120% (the film thickness related to the amplitude peak is set at 100%), an adequately high signal amplitude can be obtained.

FIG. 7 is a graph showing the dependency of a signal modulation level upon film thickness. The signal modulation level has a value obtained by dividing the signal amplitude by a reflection light intensity in a recorded region. Curves 501 and 502 indicate the calculation results in the in-groove recording mode and on-land recording mode, respectively. According to FIG. 7, the peak of the modulation-level in the in-groove recording mode appears in the vicinity of 18 nm, and the peak of the modulation level in the on-land recording mode appears in the vicinity of 13 nm. As can be seen from FIG. 7, if the film thickness is set at 80% to 120% (the film thickness related to the amplitude peak is set at 100%), an adequately high signal modulation level can be obtained.

As can be understood from the above calculation results, in the in-groove recording mode in which the mark is formed in the groove, the characteristics of the recording medium can be improved by increasing the thickness of the recording material layer than in the prior art. In the on-land recording mode, the characteristics can be improved by decreasing the thickness of the recording material layer than in the prior art. In this embodiment, the optimal characteristics of the recording medium can be achieved by setting the thickness of the recording material layer, d, in the range of 15 nm<d<23 nm. On the other hand, in the on-land recording mode in which the mark is formed between grooves, the optimal characteristics of the recording medium can be achieved by setting the thickness of the recording material layer, d, in the range of 10 nm<d<17 nm.

A second embodiment of the invention will now be described. The layered structure of the optical recording medium is the same as shown in FIG. 3. Specifically, the recording medium is formed such that an inner protection layer 104, a recording material layer 105, an outer protection layer 106, a metallic reflection layer 107, and a disk protection layer 108 are laminated, in this order, on the transparent substrate 103. Tracking guide grooves 109 are formed in the transparent substrate 103. Polycarbonate resin is used as material of the transparent substrate 103, and $ZnS-SiO_2$ is used as material of the inner protection layer 104 and outer protection layer 106. A GeSbTe-based phase-variation recording material is used for the recording material layer 105, Al is used for the reflection layer 107, and an ultraviolet-curing resin is used for the disk protection layer 108. The Ge-Sb-Te ratio of the recording material layer is 2:2:5.

In the second embodiment, the thickness of the inner protection layer 104 is set at 100 nm, and that of the outer protection layer 106 is set at 20 nm. The thickness of the reflection layer 107 is set at 100 nm. Since the extinction coefficient of Al, of which the reflection layer 107 is formed, is relatively high, the thickness of the reflection layer 107 is not strictly limited. Even if the thickness of the reflection layer 107 exceeds 100 nm, the optical characteristics of the layer 107 do not greatly vary. In addition, a mark is formed on the medium with a groove having a track pitch of 1.0 micron and a groove-width of 0.5 micron. At this time, the variation of the reproduced signal due to the variation in thickness of the recording material layer 105 is calculated. The composition ratio of the recording material and optical constants in the second embodiment differ from those in the first embodiment. Thus, the optimal thickness in the second embodiment differs slightly from that in the first embodiment.

The calculation results of the reproduced signal amplitude of the recording medium according to the second embodiment correspond to those in the first embodiment as shown in FIG. 6. A curve 401 indicates the calculation results relating to the in-groove recording, and a curve 402 indicates the calculation results relating to the on-land recording. According to FIG. 8, amplitude peaks appear at a plurality of locations. This is due to the interference effect of the thin film. Since the recording material layer 105 has absorption characteristics, the amplitude peak approaches a constant value in accordance with the increase in film thickness. If the film thickness with which the maximum amplitude peak is obtained is selected, a highest-level signal can be obtained. However, if there is a problem in conditions such as recording characteristics, productivity of medium, etc., the thickness of the recording material layer 105 may be set in the vicinity of values related to the second and third amplitude peaks.

Figure 9:
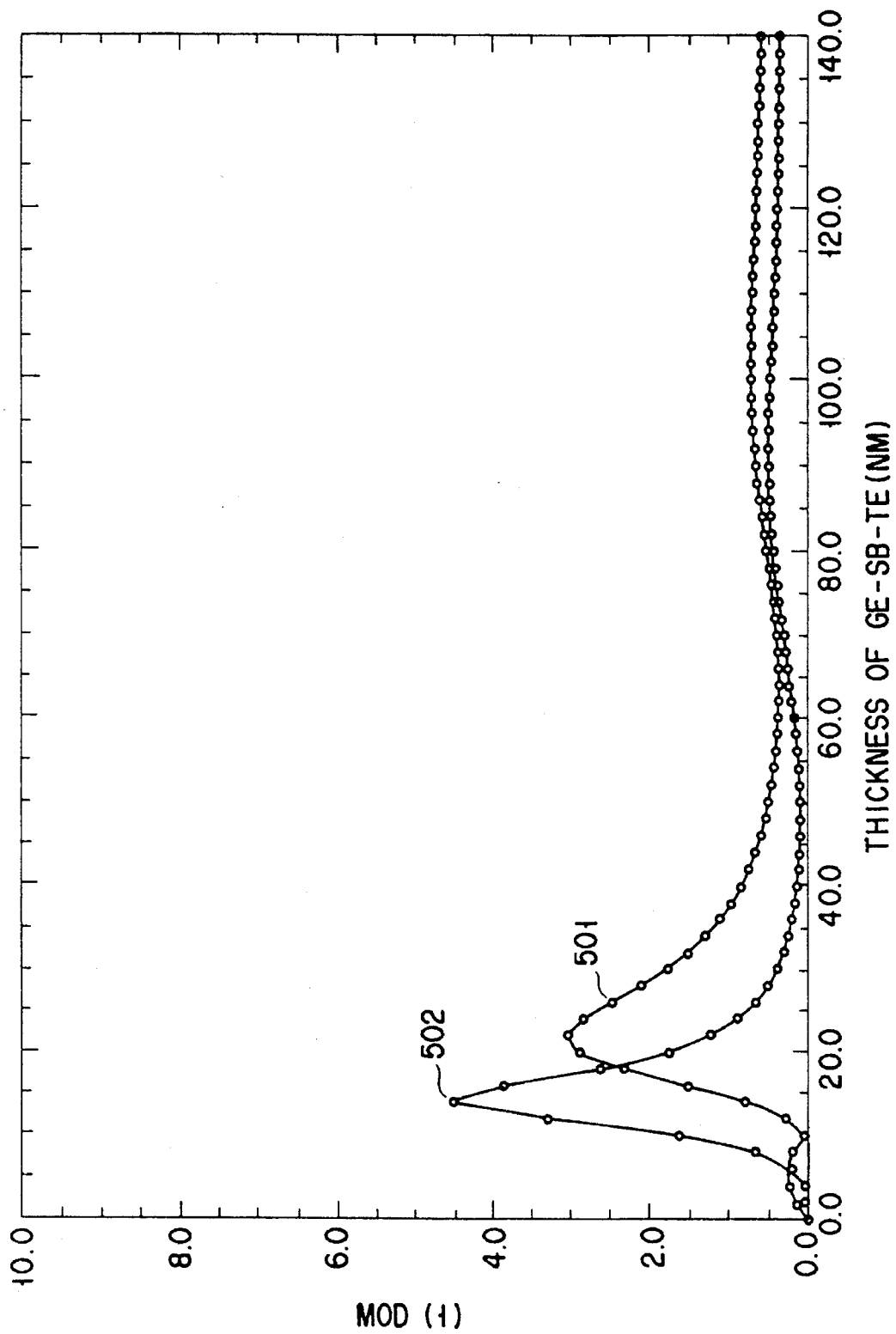
FIG. 9 is a graph in which the signal modulation level in the recording medium according to the second embodiment of the invention is plotted.

FIG. 9 is a graph in which the signal modulation level obtained with the recording medium according to the second embodiment is plotted. FIG. 9 corresponds to FIG. 7 relating to the first embodiment. The signal modulation level has a value obtained by dividing the signal amplitude by a reflection light intensity in a recorded region. In FIG. 9, curves 501 and 502 indicate the calculation results in the in-groove recording mode and on-land recording mode, respectively. According to FIG. 9, when the film thickness has values related to the second and third peaks or thereabouts, the modulation levels are low. From the viewpoint of reproduction characteristics, this film thickness is not advantageous.

Figure 8:
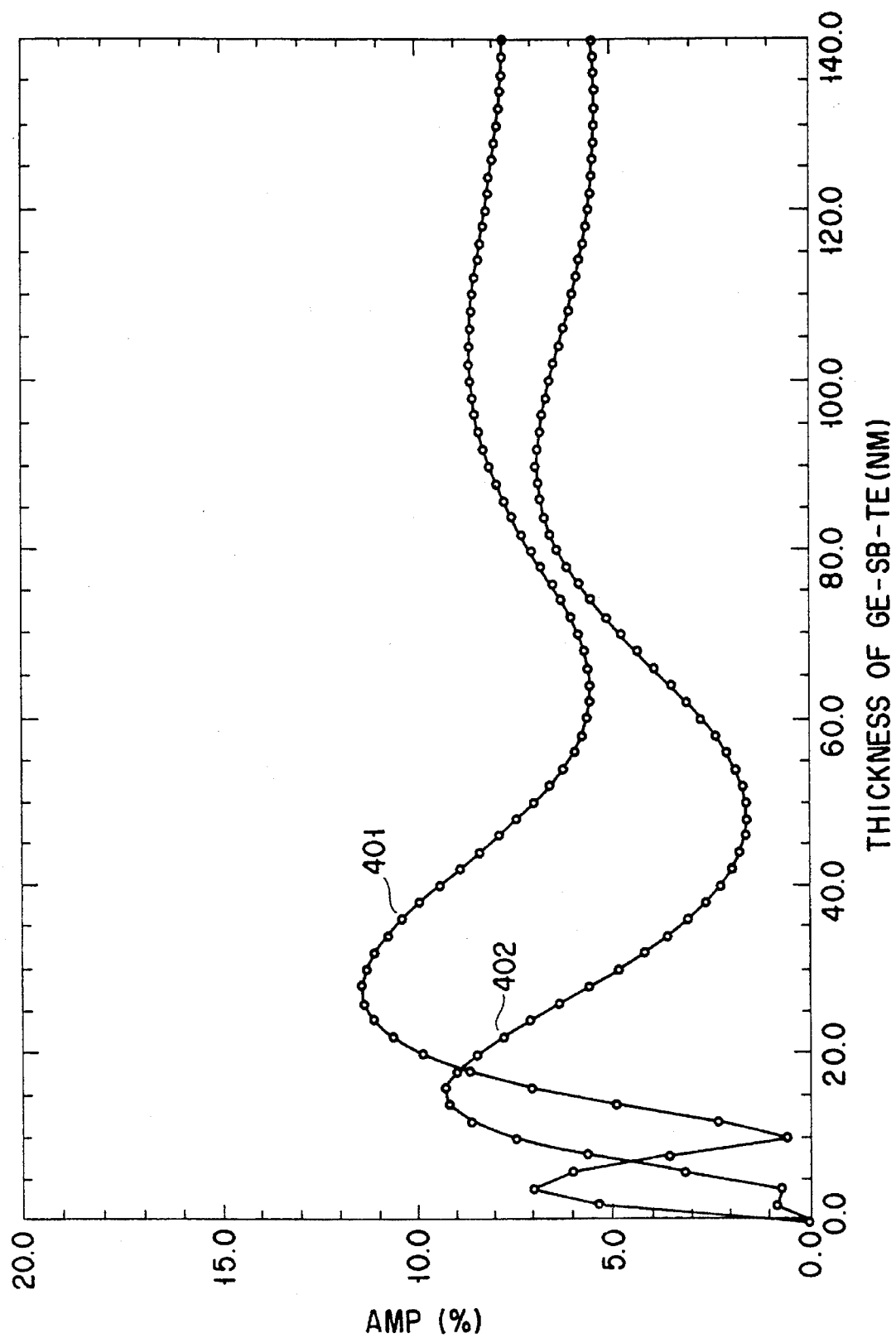
FIG. 8 is a graph showing calculation results of reproduced signal amplitude in a recording medium according to a second embodiment of the invention.
Figure 10:
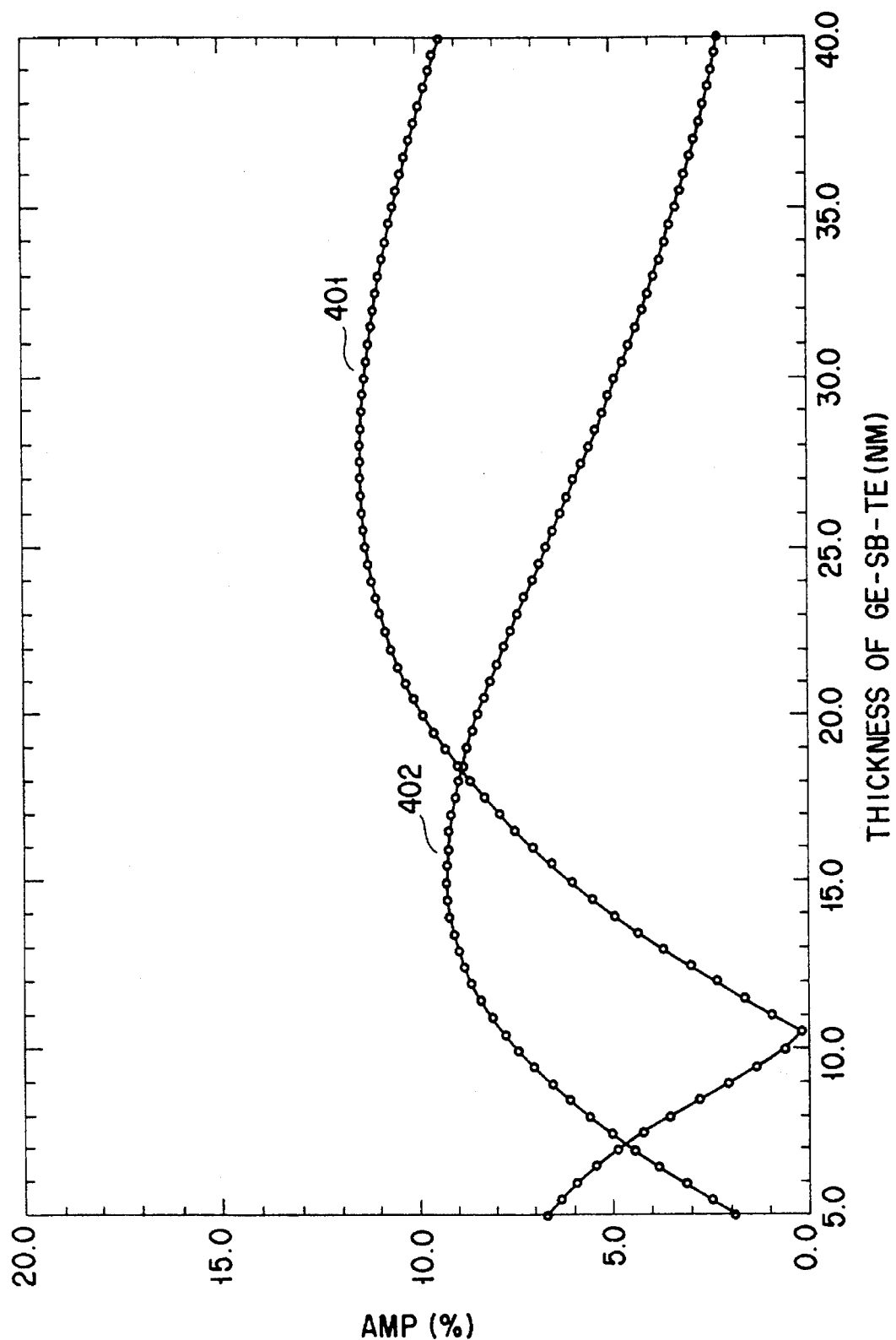
FIG. 10 is a graph showing in detail the behavior of the signal amplitude near its peak in FIG. 8.
Figure 11:
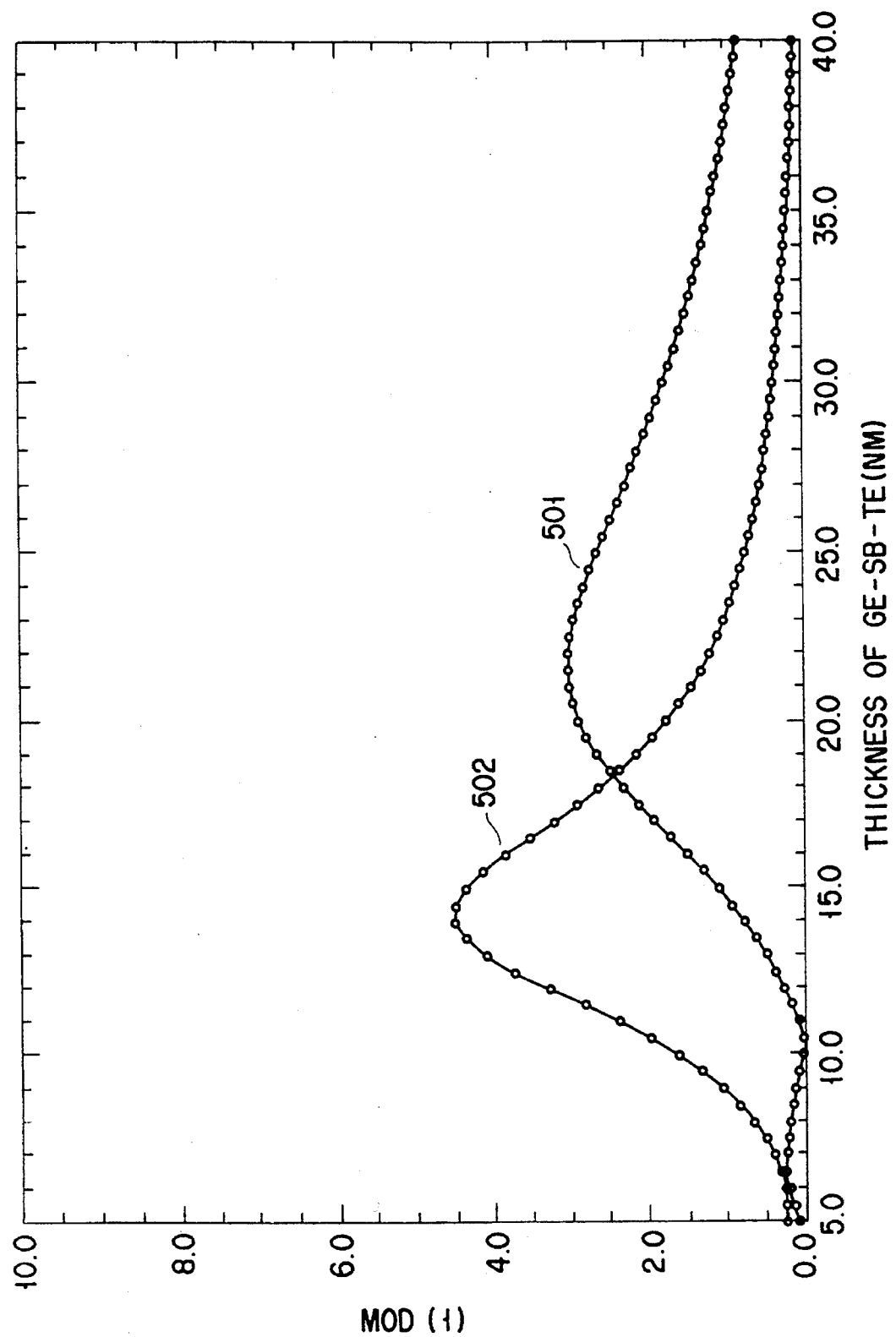
FIG. 11 is a graph showing in detail the behavior of the signal modulation level near its peak in FIG. 9.

FIG. 10 is a graph showing in detail the behavior of the signal amplitude near its peak in FIG. 8, and FIG. 11 is a graph showing in detail the behavior of the signal modulation level near its peak in FIG. 9. In FIG. 10, a curve 401 indicates the calculation results relating to the in-groove recording, and a curve 402 indicates the calculation results relating to the on-land recording. The peak in the in-groove recording is in the vicinity of 27.5 nm, and the peak in the on-land recording is in the vicinity of 15 nm. As can be seen from FIG. 10, if the film thickness is set at 50% to 150% (the film thickness related to the amplitude peak is set at 100%), an adequately high signal amplitude level can be obtained.

In FIG. 11, curves 501 and 502 indicate the calculation results in the in-groove recording mode and on-land recording mode, respectively. The peak in the in-groove recording is in the vicinity of 22 nm, and the peak in the on-land recording is in the vicinity of 14 nm. As can be seen from FIG. 11, if the film thickness is set at 50% to 150% (the film thickness related to the modulation peak is set at 100%), an adequately high signal modulation level can be obtained, and this film thickness is effective. Based on these results, the optical range of film thickness can be determined. In the second embodiment, the characteristics of the recording medium in the in-groove recording mode are further improved by setting the thickness d of the recording material layer 105 in the range of 18 nm<d<30 nm. On the other hand, the characteristics of the recording medium in the on-land recording mode in which the mark is formed between grooves are further improved by setting the thickness d of the recording material layer 105 in the range of 10 nm<d<19 nm.

Under the film thickness conditions corresponding substantially to the intersection of curves 401 and 402 in FIG. 10 and the intersection of curves 501 and 502 in FIG. 9, substantially the same signal quality can be obtained both in the in-groove recording mode and on-land recording mode. The recording medium having such structure is applicable to either the in-groove recording mode or on-land recording mode, or to the combination of both recording modes. In this case, in particular, remarkable effects can be attained by setting the thickness of the recording material layer at 14 nm. It is similarly effective, in third and fourth embodiments (described later), to find the conditions for attaining substantially the same signal quality in the in-groove recording and on-land recording modes, on the basis of the intersections of the curves.

It is thought that the in-groove recording is effective in enhancing the density of tracks. The conditions for setting the film thickness in this case will now be described. Also, an example obtained by reviwing the second embodiment from another point of view will be described. In this case, the layered structure of the optical recording medium is identical to that shown in FIG. 3.

Suppose that the thickness of the inner protection layer 104 is d1, the thickness of the recording material layer 105 is d2, and the thickness of the outer protection layer 106 is d3. FIG. 12 shows the variation of the modulation level at the time the value of d2/d3 is varied. In order to maintain a satisfactory S/N and achieve the high performance of the recording/reproducing apparatus, the modulation level must be 2 or above. For this purpose, the value of d2/d3 must be in the range of 0.52 to 0.95. In addition, when the value of d2/d1 is varied, the modulation level varies, as shown in FIG. 13. In this case, too, in order to maintain a satisfactory S/N and achieve the high performance of the recording/reproducing apparatus, the modulation level must be 2 or above. For this purpose, the value of d2/d1 must be in the range of 0.053 to 0.098.

Next, the conditions for setting the film thickness in the on-land recording mode will now be described with reference to FIGS. 14 and 15.

FIG. 14 shows the variation of the modulation level at the time the value of d2/d3 is varied. Referring to FIG. 14, in order to obtain the modulation level of 2 or above, the value of d2/d3 must be in the range of 0.32 to 0.6. In addition, when the value of d2/d1 is varied, the value of d2/d1 must be in the range of 0.033 to 0.063 as shown in FIG. 15, in order to obtain the modulation level of 2 or above.

In a modification of the second embodiment, the thickness of the inner protection layer 104 is set at 240 nm, and that of the outer protection layer 106 is set at 25 nm. The thickness of the reflection layer 107 is set at 100 nm. Since the extinction coefficient of Al, of which the reflection layer 107 is formed, is relatively high, the thickness of the reflection layer 107 is not strictly limited. Even if the thickness of the reflection layer 107 exceeds 100 nm, the optical characteristics of the layer 107 do not greatly vary. In addition, a mark is formed on the medium with a groove having a track pitch of 1.0 micron and a groove width of 0.5 micron.

A third embodiment of the invention will now be described. The layered structure of the optical recording medium is the same as that of the second embodiment. Specifically, the recording medium is formed such that an inner protection layer 104, a recording material layer 105, an outer protection layer 106, a metallic reflection layer 107, and a disk protection layer 108 are laminated, in this order, on the transparent substrate 103. Tracking guide grooves 109 are formed in the transparent substrate 103. Polycarbonate resin is used as material of the transparent substrate 103, and ZnS-SiO$_2$ is used as material of the inner protection layer 104 and outer protection layer 106. A GeSbTe-based phase-variation recording material is used for the recording material layer 105, Al is used for the reflection layer 107, and an ultraviolet-curing resin is used for the disk protection layer 108. The Ge-Sb-Te ratio of the recording material layer is 2:2:5.

In the third embodiment, the thickness of the inner protection layer 104 is set at 100 nm, and that of the recording material layer 105 is set at 22 nm. The thickness of the reflection layer 107 is set at 100 nm. A mark is formed on the medium with a groove having a track pitch of 1.0 micron and a groove width of 0.5 micron. At this time, the variation of the reproduced signal due to the variation in thickness of the outer protection layer 106 is calculated.

Figure 16:
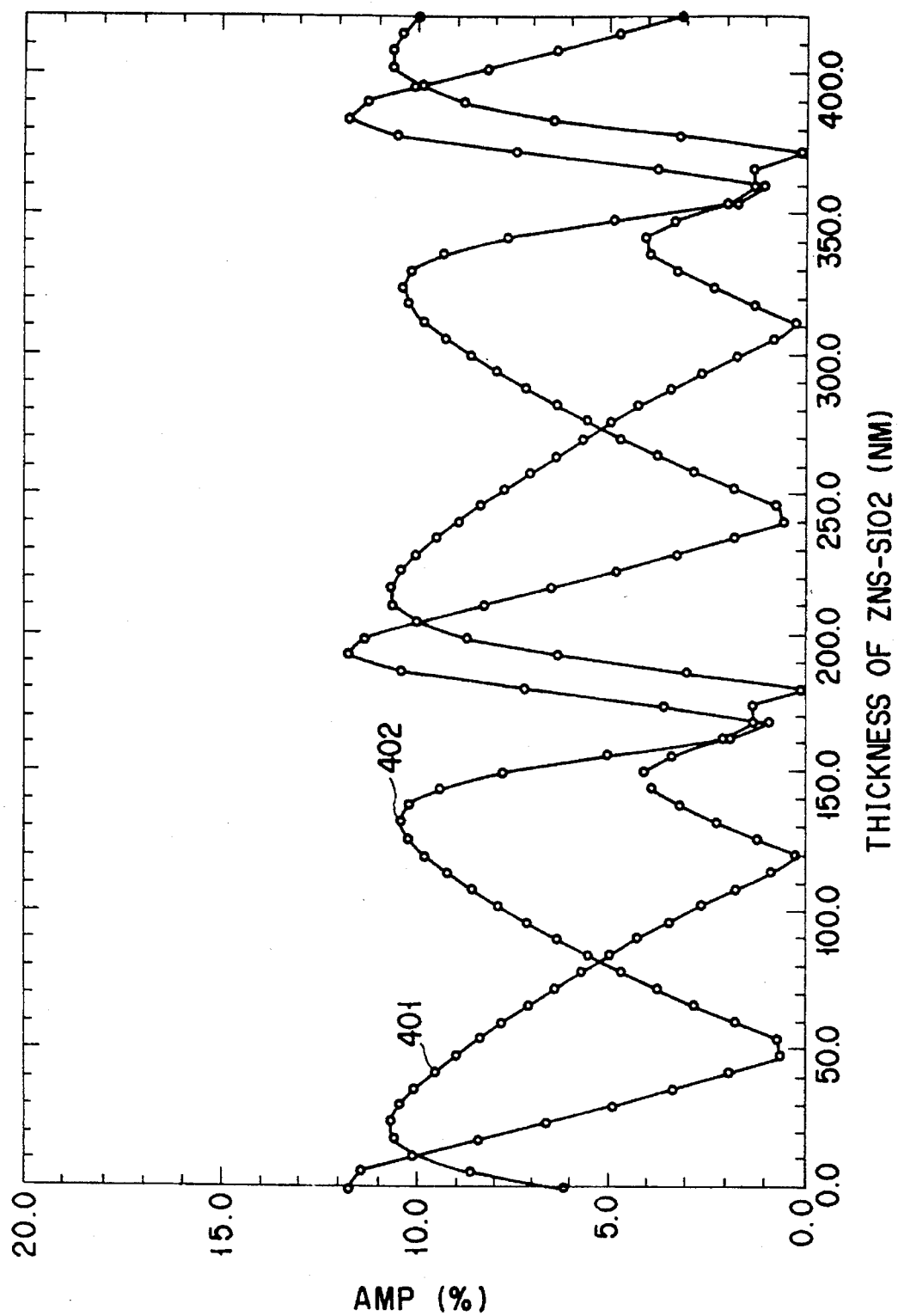
FIG. 16 is a graph showing calculation results of reproduced signal amplitude in a recording medium according to a third embodiment of the invention.

FIG. 16 shows the calculation results of the reproduced signal amplitude on the basis of the recording medium of the third embodiment. In FIG. 16, curves 401 and 402 indicate the calculation results in the in-groove recording mode and on-land recording mode, respectively. From FIG. 16, it is understood that the signal amplitude characteristics differ in the in-groove recording mode and on-land recording mode. Amplitude peaks appear at a plurality of locations as a result of the interference of the thin film. Since the material of the outer protection layer 106 has no light-absorption properties, a predetermined amplitude pattern is cyclically repeated in accordance with the increase in film thickness. The cycle of repetition corresponds to half the wavelength of light in the outer protection layer 106. In the predetermined amplitude pattern, there may be a condition in which a highest peak and another peak lower than the highest peak occur. In this embodiment, this condition can be clearly observed. If the film thickness related to the highest amplitude peak is initially selected, a maximum signal can be obtained with a least film thickness. However, considering the advantages/disadvantages in the recording characteristics, productivity of the medium and other conditions, the film thickness associated with the second peak, third peak, or an amplitude near the highest peak may be selected. In addition, in the case where a signal of an adequately high level can be obtained even if a maximum peak is not present at a thickness value close to zero, a film thickness with which the high-level signal can be obtained is selected.

FIG. 17 is a graph in which the signal modulation level based on the recording medium according to the third embodiment of the invention is plotted. Curves 501 and 502 indicate the calculation results in the in-groove recording mode and on-land recording mode. According to FIG. 17, the modulation level is low at a thickness value near the highest peak, and it is understood that this thickness value is not advantageous from the viewpoint of reproduction characteristics.

In addition, when the reproduction of the recording signal at two or more wavelengths is considered, the range of film thickness which ensures good characteristics is further limited. For example, this problem arises when the compatibility of the recording medium is desired between apparatuses employing different wavelengths. In this case, it is necessary to calculate the signal modulation level by using optical constants corresponding to the respective wavelengths and to determine the range of film thickness which ensures a satisfactory signal amplitude or signal modulation level at each of the wavelengths. Specifically, when the film thickness with which the peak can be obtained is set at 100%, the modulation levels at the respective wavelengths are calculated in the range of film thickness of 50% to 150%, and the film thickness corresponding to the overlapping calculation results is selected. In this case, since the cycle of the modulation level pattern varies depending on wavelengths, it is advantageous, from the viewpoint of characteristics of the recording medium, to set the film thickness at a value associated with the first occurring peak. Although it is possible to set the film thickness at a value associated with the second or subsequent peak, the film thickness becomes greater than in usual cases, which is a little disadvantageous in consideration of the manufacturing efficiency or other characteristics. Thus, the film thickness must be set carefully.

Figure 18:
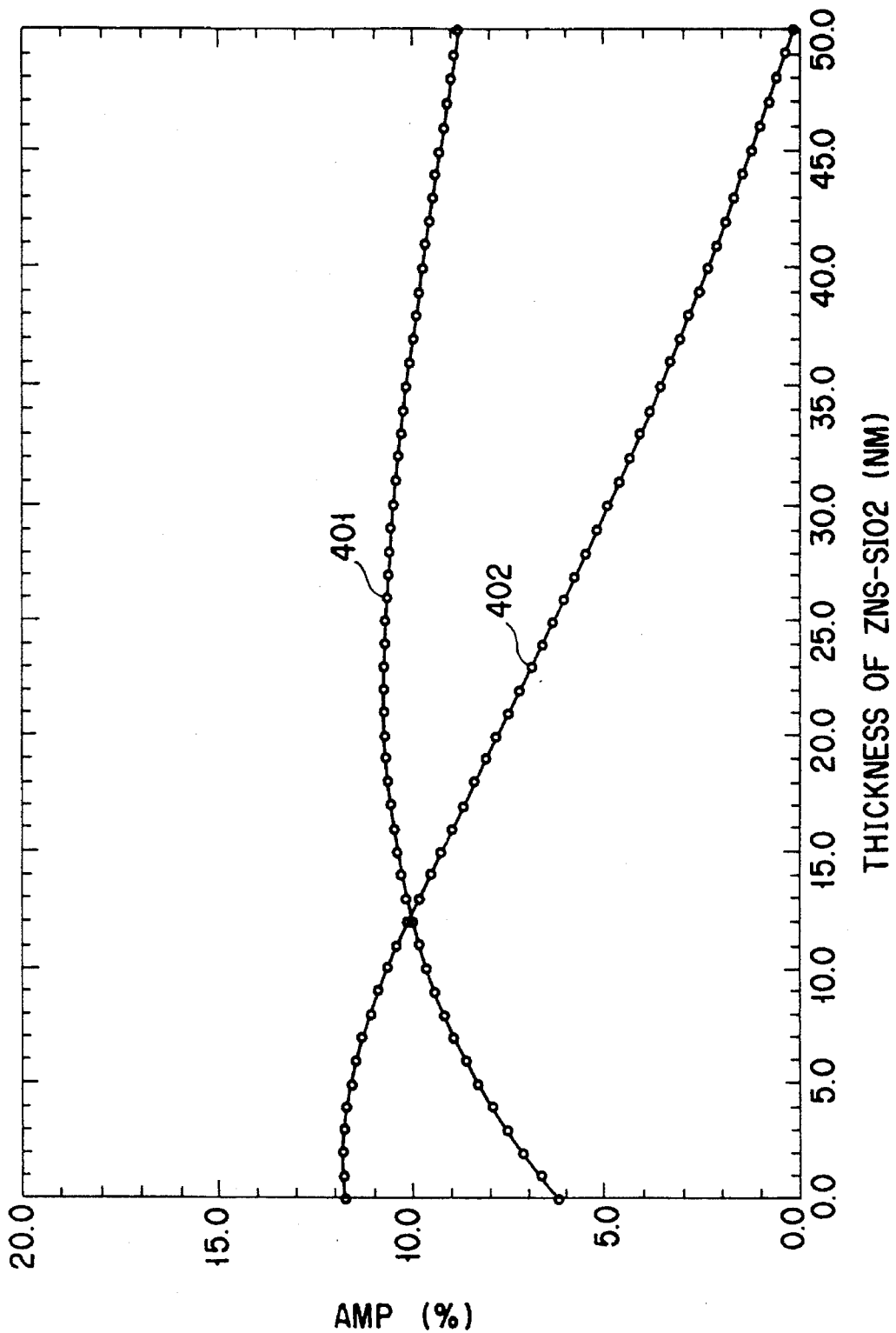
FIG. 18 is a graph showing in detail the behavior of the signal amplitude near its peak in FIG. 16.
Figure 19:
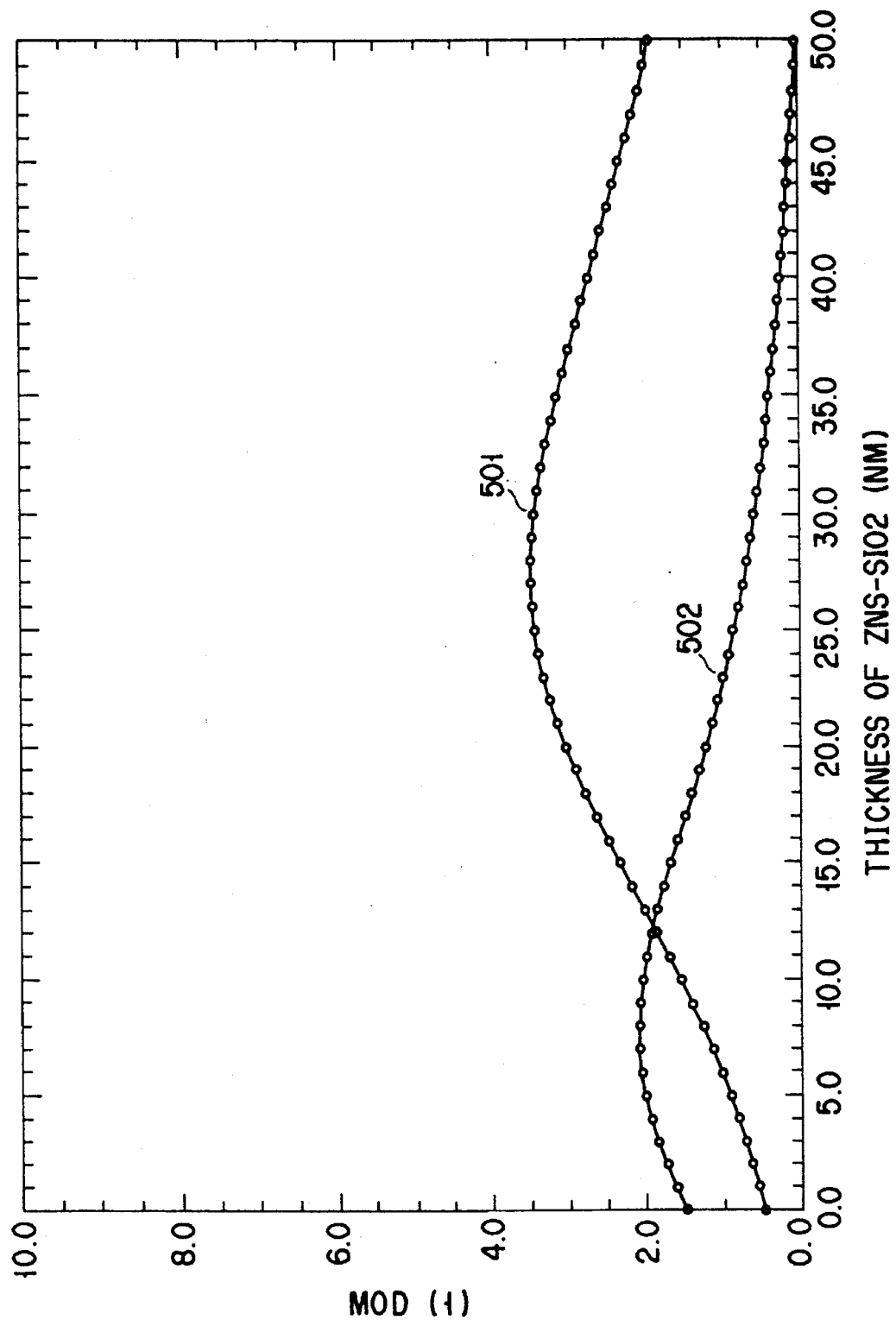
FIG. 19 is a graph showing in detail the behavior of the signal modulation level near its peak in FIG. 17.

FIG. 18 is a graph showing in detail the behavior of the signal amplitude near its peak in FIG. 16, and FIG. 19 is a graph showing in detail the behavior of the signal modulation level near its peak in FIG. 17. In FIG. 18, a curve 401 indicates the calculation results relating to the in-groove recording, and a curve 402 indicates the calculation results relating to the on-land recording. The peak in the in-groove recording appears when the thickness of the outer protection layer 106 is in the vicinity of 22 nm, and the peak in the on-land recording appears when the thickness of the outer protection layer 106 is in the vicinity of 2 nm. As can be seen from FIG. 18, the amplitude peak in relation to the variation in film thickness of the outer protection layer 106 is not conspicuous, as compared to the peak in relation to the variation in film thickness of the recording material layer 105. In each case, however, if the film thickness is set at 50% to 150% (the film thickness related to the amplitude peak is set at 100%), an adequately high signal amplitude level can be obtained, and the film thickness in this range is effective.

In FIG. 19, curves 501 and 502 indicate the calculation results in the in-groove recording mode and on-land recording mode, respectively. The peak in the in-groove recording appears when the film thickness is in the vicinity of 28 nm, and the peak in the on-land recording appears when the film thickness is in the vicinity of 8 nm. As can be seen from FIG. 19, if the film thickness is set at 50% to 150% (the film thickness related to the modulation peak is set at 100%), an adequately high signal modulation level can be obtained, and this film thickness is effective. Based on these results, the optical range of film thickness can be determined. In the third embodiment, the characteristics of the recording medium in the in-groove recording mode are further improved by setting the thickness d of the outer protection layer 106 in the range of 18 nm<d<35 nm. On the other hand, the characteristics of the recording medium in the on-land recording mode in which the mark is formed between grooves are further improved by setting the thickness d of the outer protection layer 106 in the range of 1 nm<d<12 nm.

A fourth embodiment of the invention will now be described. The layered structure and material of the optical recording medium are the same as those of the second or third embodiment, and a description thereof may be omitted.

In the fourth embodiment, the thickness of the outer protection layer 106 is set at 20 nm, and that of the recording material layer 105 is see at 22 nm. The thickness of the reflection layer 107 is set at 100 nm. A mark is formed on the medium with a groove having a track pitch of 1.0 micron and a groove width of 0.5 micron. At this time, the variation of the reproduced signal due to the variation in thickness of the inner protection layer 104 is calculated.

Figure 20:
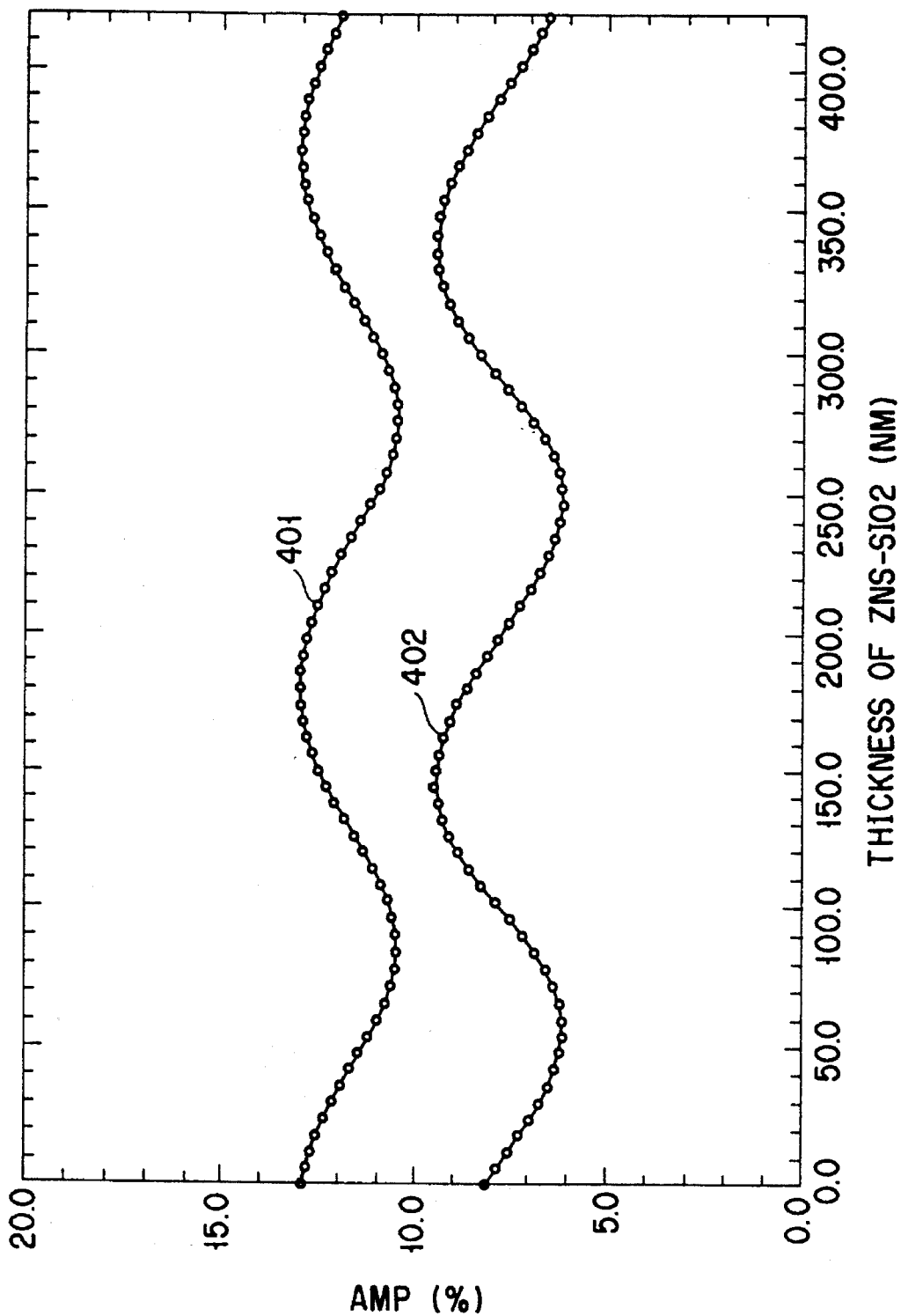
FIG. 20 is a graph showing calculation results of reproduced signal amplitude in a recording medium according to a fourth embodiment of the invention.

FIG. 20 shows the calculation results of the reproduced signal amplitude on the basis of the recording medium of the fourth embodiment. In FIG. 20, curves 401 and 402 indicate the calculation results in the in-groove recording mode and on-land recording mode, respectively. From FIG. 20, it is understood that the signal amplitude characteristics differ in the in-groove recording mode and on-land recording mode. Amplitude peaks appear at a plurality of locations as a result of the interference of the thin film. Since the difference between the refractive index of the inner protection layer 104 and that of the substrate material is smaller than in the case of the third embodiment, the variation in amplitude in FIG. 20 is gentle, as compared to FIGS. 16 and 17. However, the signal quality can be varied by the manner of setting the film thickness. In the fourth embodiment, like the third embodiment, an amplitude pattern is repeated at a cycle corresponding to half the wavelength of light in the inner protection layer 104. Thus, even if the film thickness is set in the vicinity of the maximum peak, the degree of freedom of an integer-number of times of the cycle is provided. The curve 401 in FIG. 20 does not have a maximum peak in the vicinity of the zero of the film thickness, but a signal of an adequately high level can be obtained. The film thickness may be set at this value, or near 180 nm associated with the peak. However, considering the advantages/disadvantages in the recording characteristics, productivity of the medium and other conditions, the film thickness can be set in the vicinity of the second or third peak.

Figure 21:
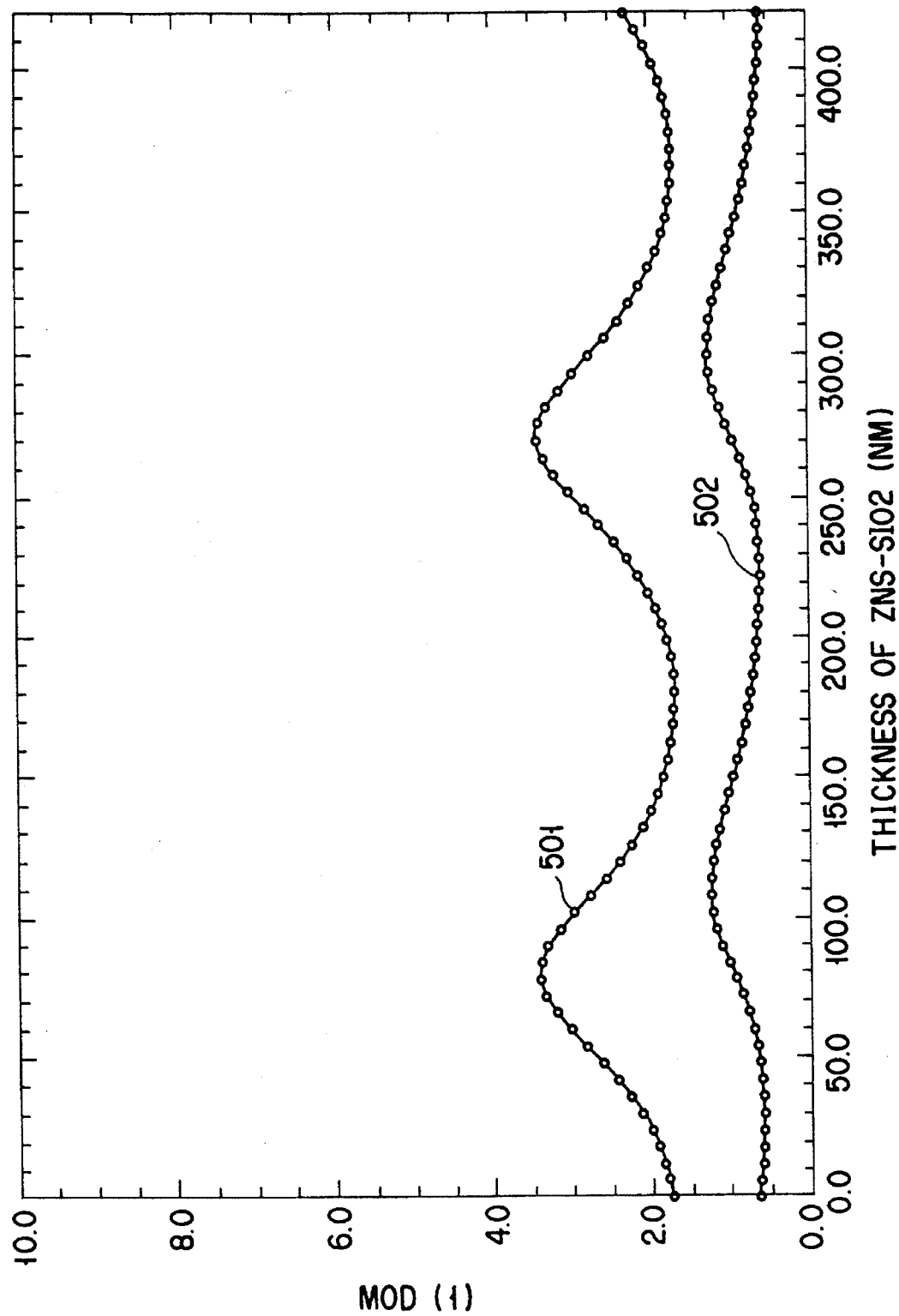
FIG. 21 is a graph in which the signal modulation level in the recording medium according to the fourth embodiment of the invention is plotted.

FIG. 21 is a graph in which the signal modulation level in the recording medium according to the fourth embodiment is plotted. Curves 501 and 502 indicate the calculation results in the in-groove recording mode and on-land recording mode, respectively. From the calculation results, it is understood that in the in-groove recording mode, the thickness of the inner protection layer 104 may be set in the vicinity of 180 nm or 80 nm, depending on whether emphasis is put on the signal amplitude or modulation level. In addition, the modulation peak in the on-land recording mode may be set in the vicinity of the film thickness of 145 nm or 115 nm. As can be seen from FIG. 21, the modulation level pattern is repeated at a cycle corresponding to half the wavelength of light in the inner protection layer 104, i.e. 191.7 nm. An excellent signal quality can be achieved if the error in thickness is within ¼ or a quarter times the cycle, i.e. within the range of film thickness of ±47.9 nm associated with the modulation peak. The film thickness in this range is effective. Further, in consideration of the degree of freedom of an integer-number of times of the cycle, a high signal quality can be obtained by setting the film thickness in the range of ±47.9 and ±191.7×m (m=an integer) of the thickness associated with the peak (the unit= nm).

When it is desired that the reproduction characteristics be ensured at plural wavelengths, the range of film thickness of the protection layer is calculated, as in the third embodiment, with respect to each wavelength, and the film thickness is set in the overlapping range.

A fifth embodiment of the invention will now be described.

According to the study by the inventors, it was found that the pre-recording and post-recording reproduced signal modulation levels are different between the in-groove recording mode and on-land recording mode. Such a difference is reflected on the difference in CNR. The CNR in the on-land recording mode is high, and the CNR in the in-groove recording mode is low.

The fifth embodiment has been achieved in consideration of the above. The layered structure of the recording medium 100 in the fifth embodiment is the same as that shown in FIG. 3. In the fifth embodiment, too, the inner protection layer 104 and outer protection layer 106, both made of $ZnSiO_2$, are 100 nm thick and 20 nm thick, respectively. The thickness of the reflection layer 107 made of Al is fixed at 100 nm. The reflectance on an in-groove region and the reflectance on an inter-groove region vary, as shown in FIG. 5, when the thickness of the recording material layer 105 of GeSbTe is varied. The magnitude of the ratio of reflectances before and after recording represents the magnitude of the reproduced signal modulation level. Thus, the modulation level in the in-groove recording mode can be evaluated on the basis of the ratio between the pre-recording reflectance 301 and the in-groove recording reflectance 302, and the modulation level in the inter-groove (on-land) recording mode can be evaluated on the basis of the ratio between the pre-recording reflectance and the on-land recording reflectance 303. From FIG. 5, it is understood that the layered structure with which the modulation level increases in the in-groove recording mode is present independently of the layered structure with which the modulation level increases in the on-land recording mode. In FIG. 5, when the thickness of the recording material layer is 15 nm or less, the modulation level in the on-land recording mode is high. When it is 15 nm or above, the modulation level in the in-groove recording mode is high. Thus, by setting the thickness of the recording material layer 105 of the optical recording medium at 15 nm or above, a high CNR and a high-quality reproduced signal can be achieved in the in-groove recording mode. FIG. 5 shows the case where the thickness of only the recording material layer 105 is varied. However, it is understood, from the preceding embodiments, that the modulation level can be controlled by varying the thickness of the inner protection layer 104 or the outer protection layer 106.

Based on the data shown in FIG. 5, the thickness of the recording material layer 105 was set at about 25 nm, and the other layers were formed under the aforementioned conditions. Thus, the recording medium was manufactured. The table below shows the measurement results of the CNR and reproduced signal modulation level.

TABLE

|  | CNR (dB) | Reproduced Signal Mobulation Level (%) |
| --- | --- | --- |
| In-Groove Recording | 53.5 | 29 |
| On-Land Recording | 53.6 | 23 |

As is clear from the above table, the modulation level in the in-groove recording is higher than the modulation level in the on-land recording. The CNR in the in-groove recording mode is 53.5 dB. This value shows that a high-quality reproduced signal is obtained. According to the results of the above table, the CNR in the in-groove recording mode is substantially equal to the CNR in the on-land recording mode. This means that the variation in shape of the groove of the optical recording medium appears as noise during reproduction and degrades the CNR. In the in-groove reproducing mode, the intensity of light at the groove end is greater than in the on-land reproducing mode. Thus, the in-groove reproduction is easily influenced by the variation in groove shape, and noise is emphasized. If the optical recording medium with less variation in groove shape were employed, the CNR in the in-groove recording mode would be greater than the CNR in the on-land recording mode.

Figure 22:
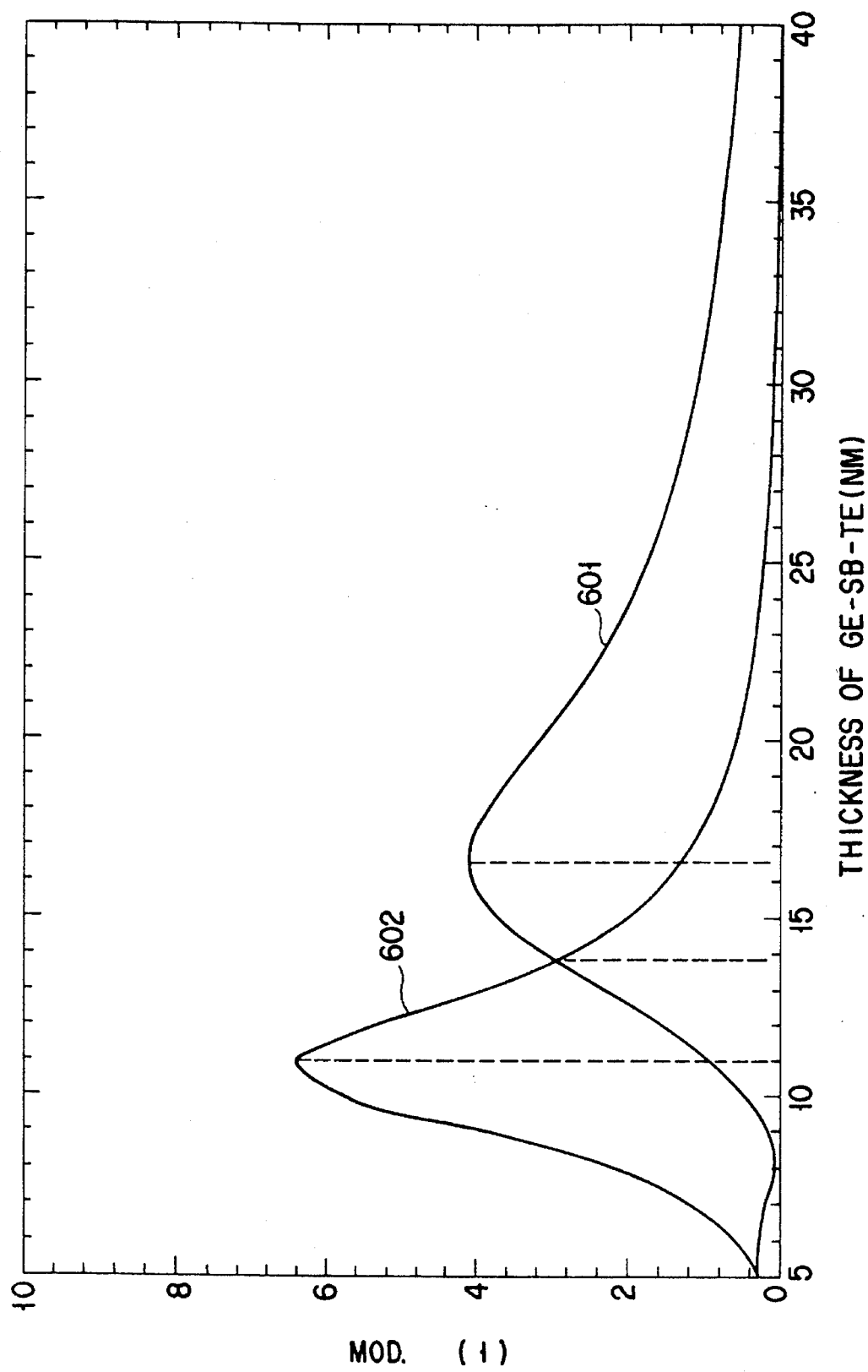
FIG. 22 shows signal modulation level in in-groove recording and on-land recording.

FIG. 22 shows modulation level curves in the in-groove recording and on-land recording modes in relation to the variation in thickness of the recording material layer 105. Curves 601 and 602 indicate the modulation levels in the in-groove recording mode and on-land recording mode. The range of film thickness between a reference value corresponding to the intersection between the curves 601 and 602 and a value corresponding to the reflectance peak in the in-groove recording mode and the range of film thickness between the reference value and the a value corresponding to the reflectance peak in the on-land recording mode are selectively used, thereby setting the optimal film thickness in the in-groove recording and on-land recording.

The optical recording/reproducing apparatus using the above-described recording medium will now be described.

The basic structure of the optical recording/reproducing apparatus is shown in FIG. 1, and the structure of the optical recording medium 100 used in this apparatus is shown in FIGS. 2 and 3.

Specifically, the recording medium 100 has a disk-like structure wherein an inner protection layer 104, a recording material layer 105, an outer protection layer 106, a metallic reflection-layer 107, and a disk protection layer 108 are laminated, in this order, on a transparent substrate 103. The thickness of each of the layers 104 to 107 is several-ten nm to several-hundred nm, and the thickness of the disk protection layer 108 is several-ten μm to several-hundred μm. In the recording/reproducing mode, a laser beam 101 emitted from the laser element 111 travels through the optical systems 112 to 114 and enters the objective lens (converging lens) 102. The beam 101 emanating from the lens 102 is converged and made incident on the substrate 103 side of the recording medium 100.

The tracking guide groove 109 for guiding the light beam is formed in the substrate 103 along the track continuously, or continuously except some portions. The present embodiment employs a so-called in-groove recording method in which record marks representing a variation in optical properties, such as pits or phase-variation marks, are formed in the guide groove 109. The cross-sectional shape of the guide groove 109 will now be described in detail.

Figure 23:
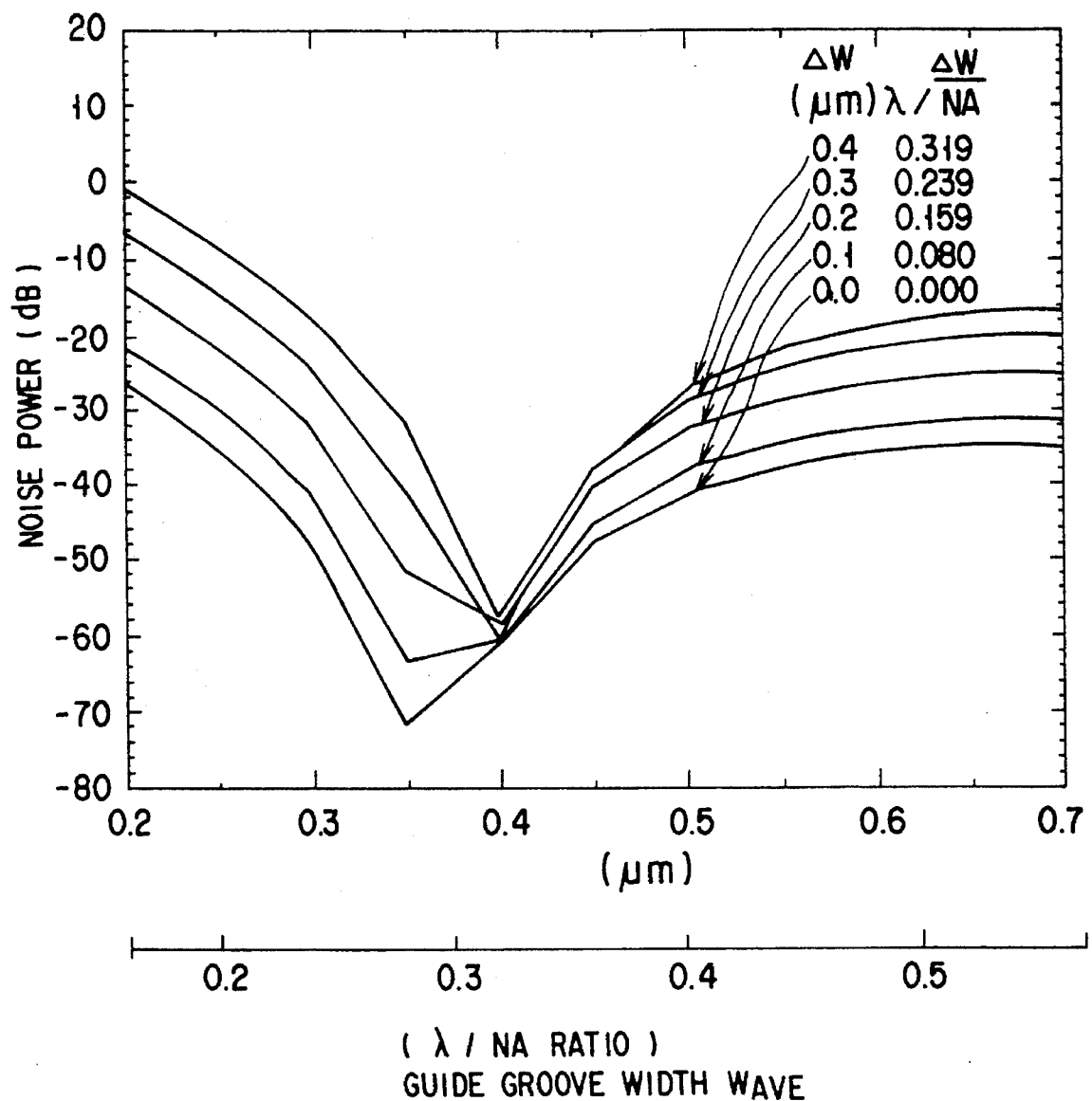
FIG. 23 shows calculation results of noise power by a diffraction light analyzing method with respect to an in-groove recording-type optical recording/reproducing apparatus.

FIG. 23 shows the calculation results of the groove noise in the reproduced signal obtained by the optical recording/reproducing apparatus shown in FIG. 1. The calculation results were obtained by the diffraction light analyzing method proposed by the inventors. The diffraction light analyzing method employed here is based on the method disclosed in "KOGAKU" (Optics), vol. 20, No. 4, pp. 314–215, "Diffraction Light Analysis in Optical Disc" (Japan Optics Society, April 1991). In addition, as a calculation method for a groove noise, there is the title "EFFECT OF GROOVE PROFILE FLACTUATION ON THE OPTICAL DISL READ-OUT SIGNAL", the Extended Abstracts (the 53rd Autumn Meeting, 1992); the Japan Society of Applied Physics, No. 3, 18a-T-2.

In FIG. 23, the vertical axis indicates the groove noise included in the reproduced signal, i.e. noise power due to a variation in wall shape of the guide groove 109. The horizontal axis indicates the average width W of the guide groove 109 which is irradiated with the light beam and is tracked, i.e. the average value of widths of the upper to lower portions of the groove.

Normally, the bottom portion of the guide groove 109 is narrower than the upper portion thereof, as shown in FIGS. 2 and 3. In FIG. 23, the difference $\Delta W$ (=W1−W2) between the width of the upper portion, W1, of the guide groove 109 and the width of the lower portion, W2, is employed as a parameter, and the variation of noise power is plotted in relation to the average width W of the guide groove 109 with respect to each value of $\Delta W$. The wavelength $\lambda$ of the light beam 101 is 690 nm, and the numerical aperture, NA, of the objective lens is 0.55.

According to the well-known conclusion derived from the formula of the diffraction light analysis, the distribution of the diffraction light is equivalent even if actual physical dimensions are different, only if the width of the upper portion, W1, of the guide groove 109, the width of the bottom portion, W2, and the average width W, which are measured on the basis of $\lambda/NA$ (the wavelength $\lambda$/the numerical aperture NA of the objective lens), are the same and the track pitch and beam spot size on the medium are the same. In FIG. 23, the $W/(\lambda/NA)$ ratio is indicated along the horizontal axis, and the $\Delta W/(\lambda/NA)$ ratio is also shown in FIG. 23 in relation to each value of $\Delta W$. In this example, $\lambda/NA = 690 \text{ nm}/0.55 = 1.255$ μm.

The calculation results in FIG. 23 are characterized by the fact that the noise power takes a minimum value when the average width W of the guide groove 109 takes a certain value, irrespective of the value of $\Delta W$. The inventors have first found that the noise power takes a minimum value at a certain point when the value W is indicated along the horizontal axis. In the example of FIG. 23, the value W is about 0.4 μm at an optimal point where the noise power is minimum. The value W=0.4 μm corresponds to $W/(\lambda/NA)$ = 0.318.

However, it is not necessary to strictly set the $W/(\lambda/NA)$ at 0.318. In practical use, it suffices to set the $W/(\lambda/NA)$ in the range of 0.25 to 0.4. In the prior art, the value $W/(\lambda/NA)$ is about 0.75, as will be described in connection with the on-land recording. On the other hand, if the value W/(λ/NA) is set in the range of 0.25 to 0.4, it is understood that the noise power decreases by 10 dB or more. In particular, if the W/(λ/NA) is set in the range of 0.29 to 0.35, the noise power further decreases with remarkable effects.

It is thought that the noise power decreases to a minimum value when the average width W of guide groove 109 and W/(λ/NA) take certain values, because under this condition the influence exerted on the reproduced signal via a main lobe of a beam spot due to the variation in wall shape of the guide groove 109 cancels the influence exerted on the reproduced signal via a side lobe (esp. a 1st-order side lobe) created by diffraction in the optical system. When the value W and W/(λ/NA) are increased above optimal levels, the noise power increases because the influence of the latter increases, as in the prior art. When the value W and W/(λ/NA) are decreased below optimal levels, the noise power increases because the influence of the former increases.

Referring to FIG. 23, as the difference ΔW between the width of the upper portion of the guide groove 109 and the width of the bottom portion thereof increases, the noise power itself increases. Thus, it is desirable that the wall of the guide groove 109 is formed almost perpendicular, and ideally Δ be zero. However, in fact, it is difficult to set Δ at zero in the manufacturing process. In the present embodiment, taking into account the degree of degradation of the guide groove 109 and the noise allowance range of the system, the value Δ is set at about 0.2 μm and the guide groove 109 is formed.

Figure 24:
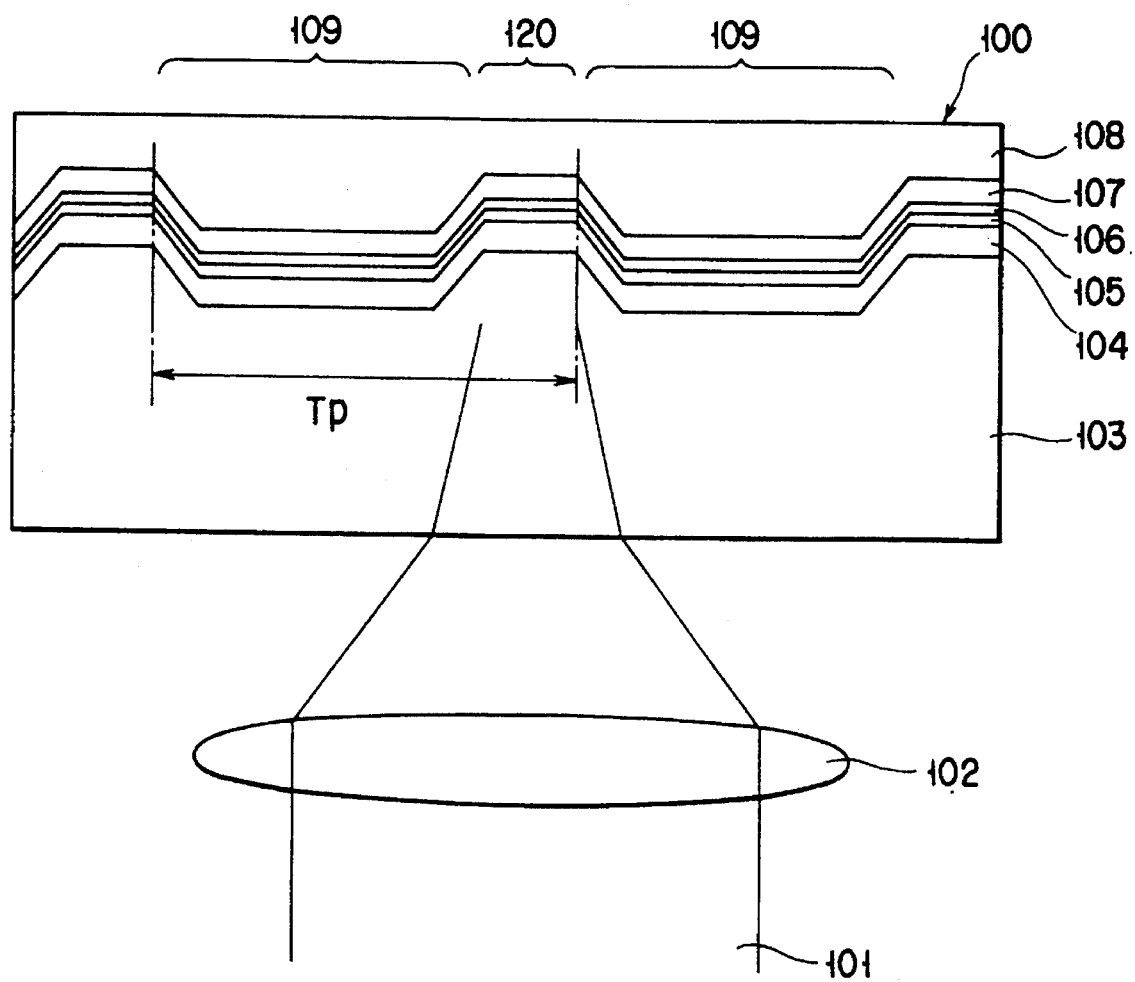
FIG. 24 shows an optical recording medium and an optical system according to an on-land recording-type optical recording/reproducing apparatus.

With reference to FIG. 24, an on-land recording-type optical recording/reproducing apparatus according to the invention will now be described. In FIG. 24, the parts having the same functions as the parts shown in FIG. 3 are denoted by like reference numerals. The embodiment of FIG. 24 differs from the embodiment of FIG. 3 in that the record mark is formed on a land 120 between the guide grooves 109 in the recording mode and therefore the method for setting the average width of the guide groove 109 varies.

The calculation results of the noise power according to the diffraction light analyzing method in this embodiment can be expressed by modifying the horizontal axis in FIG. 23. Specifically, in FIG. 23, the horizontal axis indicates the average width W of the guide groove 109 and the W/(λ/NA) ratio. By contrast, in this embodiment, the horizontal axis indicates the value Tp−W (obtained by subtracting W from the track pitch Tp) and the (Tp−W)/(λ/NA) ratio. The value Tp−W corresponds to the average width of the land 120 which is irradiated with the light beam 101 and is tracked. Thus, this modification of the horizontal axis is considered appropriate.

Since FIG. 23 can be modified, the same tendency as in the preceding embodiments can be concluded. Specifically, the noise power takes a minimum value when Tp−W is about 0.4 μm and (Tp−W)/(λ/NA) is 0.318, substantially irrespective of the value of the difference Δ between the width W1 of the upper portion of the guide groove 109 and the width W2 of the lower portion of the groove 109. In this embodiment, the track pitch Tp is 1.1 μm and the average width W of the guide groove 109 is 0.7 μm. In this embodiment, too, it is not necessary to strictly set the value (W−Tp)/(λ/NA) at 0.318. In practical use, it suffices to set the value (W−Tp)/(λ/NA) in the range of 0.25 to 0.4. in particular, if the value (W−Tp)/(λ/NA) is set in the range of 0.29 to 0.35, the noise power further decreases with remarkable effects.

The conditions set in the above embodiment will now be compared with those in a conventional optical disk. Examples of the numeral values of standard specifications of a 130 mm optical disk according to ISO are: the wavelength of the light beam=830 nm, and λ/NA=1.59 μm. The track pitch is 1.6 μm, and the on-land recording is performed like the present embodiment. There are no specifications of the parameters of the width, depth, etc. relating to the shape of the guide groove. Instead, the shape of the groove is specified by reproduced signal characteristics, e.g. a push-pull signal obtained at the time of reproduction is 0.4 to 0.65 time the base line reflectance, and a track transverse signal is 0.3 to 0.6 time the base line reflectance. According to diffraction light analysis and actual measurement, the average width of the guide groove which satisfies these characteristics is about 0.4 μm, and a difference between the average width and the track pitch is 1.2 μm. If this difference is expressed as a ratio to λ/NA, it is 0.75, as stated above.

According to the present embodiment, the width of the guide groove 109 is set to be greater than the width determined by the aforementioned specifications based reproduced signal characteristics, and the width of the 1and 120 on which the beam spot is formed is reduced. Thereby, the beam spot overlaps the guide groove 109 to a greater extent. As a result, the influence exerted on the reproduced signal via the main lobe of the beam spot due to the variation in wall shape of the guide groove 109 becomes suitably greater than in the prior art. Thus, the noise power can be decreased on the same principle as in the preceding embodiments. In the case of the present embodiment, it is possible that the push-pull signal and track transverse signal fail to meet the standard specifications, but such a problem can be solved by adjusting the amplification factor of the control circuit in the servo system. Thus, there is no problem in practical use.

The above embodiments are applied mainly to write-once read-many (WORM) or rewritable optical recording mediums. However, the present invention is effectively applicable to a reproduction-only optical recording medium such as a video disk. In the case of the reproduction-only medium, pit strings corresponding to information are normally formed on the medium substantially cyclically. At the time of reproduction, the pit strings are tracked by a laser beam. In physical aspects, this reproduction process is equivalent to the access of a non-continuous guide groove by means of a light beam. Accordingly, in this case, the pit string is regarded as a guide groove, and the average width of the pits is determined under the same condition as in the embodiment of FIG. 3. Thus, the noise reduction effect can be expected on the basis of the same principle.

According to the above-described recording/reproducing apparatus, the groove noise caused by the variation in reflection light due to the variation in wall shape of the guide groove can be effectively reduced in the reproducing mode. Thereby, the S/N of the reproduced signal can be increased. As a result, the recording density can be increased, and the reliability of recording can be enhanced. In addition, these advantages can easily be achieved only by setting the average width of the guide groove or the difference between the average width of the groove and the track pitch.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical recording and reproducing apparatus, comprising:

an optical recording medium having a plurality of guide grooves for tracking, at least some of said plurality of guide grooves having a plurality of recording marks which record information in an in-groove recording mode, said optical recording medium comprising a transparent substrate, an inner protection layer formed on the transparent substrate, a recording material layer formed on the inner projection layer, an outer protection layer formed on the recording material layer, and a reflection layer formed on the outer protection layer, wherein the ratio of the thickness of the recording material layer to the thickness of the outer protection layer in the in-groove recording mode is in a range between 0.52 and 0.95;

a laser element for emitting a laser beam;

an objective lens facing said optical recording medium, for converging the laser beam to the optical recording medium to record information thereon and reproduce recorded information therefrom; and a light detector for converting the laser beam reflected from said optical recording medium into an electric signal.

2. The optical recording and reproducing apparatus according to claim 1, wherein said transparent substrate is formed of a polycarbonate resin, the inner protection layer and the outer protection layer are formed of $ZnSiO_2$, the recording material layer is formed of a GeSbTe-based phase-variation recording material, the reflection layer is formed of Al (aluminum), and the Ge-Sb-Te ratio of the recording material layer is 2:2:5.

3. The optical recording and reproducing apparatus according to claim 2, wherein the thickness of the inner protection layer is 240 nm, the thickness of the outer protection layer is 25 nm, and the thickness of the recording material layer is in a range between 15 nm and 23 nm.

4. The optical recording and reproducing apparatus according to claim 2, wherein the thickness of the inner protection layer is 100 nm, the thickness of the outer protection layer is 20 nm, and the thickness of the recording material layer is in a range between 18 nm and 30 nm.

5. An optical recording and reproducing apparatus, comprising:

an optical recording medium having a plurality of guide grooves for tracking, at least some of said plurality of guide grooves having a plurality of recording marks which record information in an in-grove recording mode, said optical recording medium comprising a transparent substrate, an inner protection layer formed on the transparent substrate, a recording material layer formed on the inner projection layer, an outer protection layer formed on the recording material layer, and a reflection layer formed on the outer protection layer, wherein the ratio of the thickness of the recording material layer to the thickness of the inner protection layer in the in-groove recording mode is in a range between 0.053 and 0.098;

a laser element for emitting a laser beam;

an objective lens facing said optical recording medium, for converging the laser beam to said optical recording medium to record information thereon and reproduce recorded information therefrom; and a light detector for converting the laser beam reflected from said optical recording medium into an electric signal.

6. The optical recording and reproducing apparatus according to claim 5, wherein said transparent substrate is formed of a polycarbonate resin, the inner protection layer and the outer protection layer are formed of $ZnSiO_2$, the recording material layer is formed of a GeSbTe-based phase-variation recording material, the reflection layer is formed of Al (aluminum), and the Ge-Sb-Te ratio of the recording material layer is 2:2:5.

7. The optical recording and reproducing apparatus according to claim 6, wherein the thickness of the inner protection layer is 240 nm, the thickness of the outer protection layer is 25 nm, and the thickness of the recording material layer is in a range between 15 nm and 23 nm.

8. The optical recording and reproducing apparatus according to claim 5, wherein the thickness of the inner protection layer is 100 nm, the thickness of the outer protection layer is 20 nm, and the thickness of the recording material layer is in a range between 18 nm and 30 nm.

9. An optical recording and reproducing apparatus, comprising:

an optical recording medium having a plurality of guide grooves for tracking and a plurality of land portions each existing between adjacent two of said guide grooves, a plurality of recording marks being formed in at least some of said guide grooves to record information in an in-groove mode, and a plurality of recording marks being formed on at least some of said land portions to record information in an on-land recording mode, said optical recording medium comprising a transparent substrate, an inner protection layer formed on the transparent substrate, a recording material layer formed on the inner projection layer, an outer protection layer formed on the recording material layer, and a reflection layer formed on the outer protection layer, wherein the ratio of the thickness of the recording material layer to the thickness of the outer protection layer in the on-land recording mode and in-groove mode is in a range between 0.52 and 0.6;

a laser element for emitting a laser beam;

an objective lens facing said optical recording medium, for converging the laser beam to the optical recording medium to record information thereon and reproduce recorded information therefrom; and a light detector for converting the laser beam reflected from said optical recording medium into an electric signal.

10. The optical recording and reproducing apparatus according to claim 9, wherein said transparent substrate is formed of a polycarbonate resin, the inner protection layer and the outer protection layer are formed of $ZnSiO_2$, the recording material layer is formed of a GeSbTe-based phase-variation recording material, the reflection layer is formed of Al (aluminum), and the Ge-Sb-To ratio of the recording material layer is 2:2:5.

11. The optical recording and reproducing apparatus according to claim 10, wherein the thickness of the inner protection layer is 100 nm, the thickness of the outer protection layer is 20 nm, and the thickness of the recording material layer is in a range between 11 nm and 17 nm.

12. The optical recording and reproducing apparatus according to claim 10, wherein the thickness of the inner protection layer is 100 nm, the thickness of the outer protection layer is 20 nm, and the thickness of the recording material layer is in a range between 11 nm and 19 nm.

13. An optical recording and reproducing apparatus, comprising:

an optical recording medium having a plurality of guide grooves for tracking and a plurality of land portions each existing between adjacent two of said guide grooves, a plurality of recording marks being formed on at least some of said land portions to record information in an on-groove recording made, said optical recording medium comprising a transparent substrate, an inner protection layer formed on the transparent substrate, a recording material layer formed on the inner protection layer, an outer protection layer formed on the recording material layer, and a reflection layer formed on the outer protection layer, wherein the ratio of the thickness of the recording material layer to the thickness of the inner protection layer in the in-groove recording mode is in a range between 0.033 and 0.063;

a laser element for emitting a laser beam;

an objective lens facing said optical recording medium, for converging the laser beam to the optical recording medium to record information thereon and reproduce recorded information therefrom; and a light detector for converting the laser beam reflected from said optical recording medium into an electric signal.

14. The optical recording and reproducing apparatus according to claim 13, wherein said transparent substrate is formed of a polycarbonate resin, the inner protection layer and the outer protection layer are formed of $ZnSiO_2$, the recording material layer is formed of a GeSbTe-based phase-variation recording material, the reflection layer is formed of Al (aluminum), and the Ge-Sb-Te ratio of the recording material layer is 2:2:5.

15. The optical recording and reproducing apparatus according to claim 14, wherein the thickness of the inner protection layer is 100 nm, the thickness of the outer protection layer is 20 nm, and the thickness of the recording material layer is in a range between 10 nm and 17 nm.

16. The optical recording and reproducing apparatus according to claim 14, wherein the thickness of the inner protection layer is 100 nm, the thickness of the outer protection layer is 20 nm, and the thickness of the recording material layer is in a range between 10 nm and 19 nm.

17. An optical recording and reproducing apparatus, comprising:

an optical recording medium having a plurality of guide grooves for tracking, at least some of said plurality of guide grooves having a plurality of recording marks which record information in an in-groove recording mode, said optical recording medium comprising a transparent substrate, an inner protection layer formed on the transparent substrate, a recording material layer formed on the inner projection layer, an outer protection layer formed on the recording material layer, and a reflection layer formed on the outer protection layer, wherein the ratio of the thickness of the recording material layer to the thickness of the outer protection layer in the in-groove recording mode is in a range between 0.6 and 0.8;

a laser element for emitting a laser beam;

an objective lens facing said optical recording medium, for converging the laser beam to the optical recording medium to record information thereon and reproduce recorded information therefrom; and a light detector for converting the laser beam reflected from slid optical recording medium into an electric signal.

18. The optical recording and reproducing apparatus according to claim 17, wherein the thickness of the inner protection layer is 240 nm, the thickness of the outer protection layer is 25 nm, and the thickness of the recording material layer is a range between 15 nm and 23 nm.

19. The optical recording and reproducing apparatus according to claim 17, wherein the thickness of the inner protection layer is 100 nm, the thickness of the outer protection layer is 20 nm, and the thickness of the recording material layer is in a range between 12 nm and 16 nm.

\* \* \* \* \*